United States Patent [19]
Yokota

[11] Patent Number: 5,889,680
[45] Date of Patent: Mar. 30, 1999

[54] DEVICE SIMULATION METHOD FOR USE IN NUMERICAL ANALYSES OF A SEMICONDUCTOR DEVICE

[75] Inventor: Ikuhiro Yokota, Tokyo, Japan

[73] Assignee: NEC Corporation, Tokyo, Japan

[21] Appl. No.: 842,823

[22] Filed: Apr. 17, 1997

[30] Foreign Application Priority Data

Apr. 25, 1996 [JP] Japan ................................. 8-105215

[51] Int. Cl.⁶ ............................................. G06F 17/50
[52] U.S. Cl. ................... 364/489; 364/578; 364/468.28
[58] Field of Search ................................ 364/488, 489, 364/490, 491, 578, 468.04, 468.28

[56] References Cited

U.S. PATENT DOCUMENTS

| | | | |
|---|---|---|---|
| 4,969,116 | 11/1990 | Wada et al. | 364/578 |
| 5,379,225 | 1/1995 | Tazawa et al. | 364/468 |
| 5,617,322 | 4/1997 | Yokota | 364/468.04 |
| 5,625,578 | 4/1997 | Du Cloux et al. | 364/578 |
| 5,812,434 | 9/1998 | Nagase et al. | 364/578 |

OTHER PUBLICATIONS

Ryo, "Process Device Simulation Technique", (1990) pp. 99–105.

Sze, "Physics of Semiconductor Devices", John Willy & Sons Inc., (1981) p. 99.

Sze, "Temperature Dependence of Avalanche Multiplication in Semiconductors", Applied Physics Letters, vol. 9, No. 6, (1966) pp. 242–244.

Adachi et al., "Personal Computer Electromagnetics", Asakura Books, (1986) pp. 30–31.

Kitahara et al., "Simulation of Electromagnetic Phenomenon Learned by Personal Computer", Morikita Publishing, (1991) pp. 12–13.

*Primary Examiner*—Kevin J. Teska
*Assistant Examiner*—Leigh Marie Garbowski
*Attorney, Agent, or Firm*—Foley & Lardner

[57] ABSTRACT

A device simulation method of conducting processing for recognizing a line of electric force for use in numerical analyses of a semiconductor device including a line of electric force calculating step of calculating a search direction vector, with a predetermined point as a starting point, linking the starting point of the search direction vector with a point set on a straight line extending in the direction of the search direction vector, and repeating, as necessary, the processing for calculating a search direction vector, with the newly set point as a starting point, and the processing for linking the starting point of the calculated search direction vector with a newly set point, and a line of electric force subdividing step of repeating the processing for setting another new point on a line segment linking a starting point of a search direction vector with a newly set point to shorten the line segment and when predetermined conditions are satisfied, replacing the point set at the line of electric force calculating step with a lastly set point to return the routine to the line of electric force calculating step.

12 Claims, 19 Drawing Sheets

NMOS IMPURITY

ELECTRIC-FIELD-LINE

DEVICE SIMULATION METHOD FOR USE IN NUMERICAL ANALYSES OF A SEMICONDUCTOR DEVICE

BACKGROUND OF THE INVENTION

1. Field of the Invention

The present invention relates to a device simulation method for use in numerical analyses of a semiconductor device and, more particularly, to a device simulation method effective in a case where some area of a semiconductor device as an object of processing includes a part at which drastic change of an electric field occurs.

2. Description of the Related Art

In conventional numerical analyses of semiconductor devices, drift-diffusion models are widely used in which carriers (electron and hole) are approximated as fluid. Although energy transport models with a high level of approximate are used in some cases, description will be here made of the drift-diffusion models for the convenience of explanation.

In device simulation using a drift-diffusion model in the steady-state, such equation of conservation of charge, electronic current continuity equation and hole current continuity equation as shown below are set as basic equations. These basic equations are detailed, for example, in the literature "Process Device Simulation Technique" (written and edited by Ryo Dan, pp. 99–105, Sangyo Tosho, 1990).

$$\text{div } DV \text{ (V denotes vector)} = \rho \text{(equation of conservation of charge)} \quad (1)$$

$$DV = \epsilon EV \quad (2)$$

$$EV = -\text{grad } \psi \quad (3)$$

$$\rho = q(p - n + N_D - N_A) \quad (4)$$

where D denotes dielectric flux density, $\rho$ charge density, EV electric field, $\epsilon$ dielectric constant, q elementary charge, p hole density, n electron density, $N_D$ donor density and $N_A$ acceptor density.

$$\text{div } JV_n = q(R-G) \text{(electron current continuity equation)} \quad (5)$$

$$\text{div } JV_p = -q(R-G) \text{(hole current continuity equation)} \quad (6)$$

where $JV_n$ denotes electron current, $JV_p$ hole current, R carrier re-combination term and G carrier generation term.

$$JV_n = q \cdot n \cdot \mu_n \cdot EV + q \cdot D_n \cdot \text{grad } n \quad (7)$$

$$JV_p = q \cdot n \cdot \mu_p \cdot EV - q \cdot D_p \cdot \text{grad } p \quad (8)$$

where $\mu_n$ denotes electron mobility, $\mu_p$ hole mobility, $D_n$ electron diffusion coefficient and $D_p$ hole diffusion coefficient.

$$D_n = \mu_n \cdot (k_B \cdot T/q) \quad (9)$$

$$D_P = \mu_p \cdot (k_B \cdot T/q) \quad (10)$$

where $k_B$ denotes Boltzmann's constant and T denotes temperature.

In the above equations, variables to be solved are potential $\psi$, electron density n and hole density p. In general, with a plurality of designated biases as boundary conditions, the biases are sequentially updated to calculate the equation of conservation of charge (1), the electron current continuity equation (5) and the hole current continuity equation (6).

In actual numerical calculation, these basic equations are discretized and calculated on predetermined analysis meshes.

One of essential performance barometers of a semiconductor device is a breakdown voltage. When a high voltage is applied to a semiconductor device, the strong electric field generated in the semiconductor causes conduction electrons to gain high energy to collide with electrons in a valence band, whereby the colliding electrons are excited by a conductor to further collide with electrons in other valence band. Repetition of such collision and excitation results in generation of a large quantity of pairs of electrons and holes by geometrical progression to rapidly increase current. An applied voltage involving such phenomenon is called a breakdown voltage. In addition, the rapid generation of electrons and holes is called avalanche amplification or impact ionization.

As a breakdown voltage estimating manner by numerical calculation, there is a method of obtaining a multiplication factor of current by conducting ionization integration along a line of electric force. This technique is recited, for example, in the literature "Physics of Semiconductor Devices (Second Edition)" (written by S. M. Sze, pp. 99, John Willy & Sons Inc., 1981). The ionization integration in this literature is represented by the right side of the following expression and the multiplication factor is a value represented by $M_p$ of the left side of the following expression.

$$1 - \frac{1}{M_P} = \int_0^W \alpha_P \exp\left[-\int_0^x (\alpha_P - \alpha_n) dx'\right] dx \quad (11)$$

where x and x' represent integration variables of a one-dimensional coordinate along a line of electric force, W represents a range of integration denoting a coordinate at the end of the line of electric force, and $\alpha_P$ and $\alpha_n$ represent impact ionization coefficients of hole and electron.

An applied bias making the multiplication factor $M_P$ infinite is referred to as a breakdown voltage. The multiplication factor goes infinite in the equation (11) under the condition that the ionization integration on the right side of the equation takes the integration value of 1.

In addition, various models are proposed for the impact ionization coefficients $\alpha_P$ and $\alpha_n$. For example, in the well-known Sze and Clowell model, the coefficients are expressed by the following equations (12) to (15) as recited in the literature "Temperature Dependence of Avalanche Multiplication in Semiconductors" (C. R. Crowell, S. M. Sze, Applied Physics Letters, vol. 9, No. 6, pp. 242–244, 1966). Parameters of the equations (12) to (15) are shown in Table 1.

$$\alpha_n = a_e \cdot [1 + C_e(T - 300)] \cdot E \quad (12)$$

$$\exp\left[-\left[\frac{b_e \cdot \{1 + d_e(T - 300)\}}{E}\right]^2\right] \quad (13)$$

$$\alpha_p = a_h \cdot [1 + C_{he}(T - 300)] \cdot E \quad (14)$$

$$\exp\left[-\left[\frac{b_h \cdot \{1 + d_h(T - 300)\}}{E}\right]^2\right] \quad (15)$$

where E represents electric field strength and T represents temperature.

TABLE 1

| | (electron) | | | (hole) | |
|---|---|---|---|---|---|
| parameter | value | unit | Parameter | value | unit |
| $a_e$ | 0.426 | [1/V] | $a_h$ | 0.243 | [1/V] |
| $b_e$ | 4.81E5 | [V/cm] | $b_h$ | 6.53E5 | [V/cm] |
| $c_e$ | 3.05E-4 | [1/K] | $c_h$ | 5.35E-4 | [1/K] |
| $d_e$ | 6.86E-4 | [1/K] | $d_h$ | 5.67E-4 | [1/K] |

For conducting the above-described numerical calculation along a line of electric force, the line of electric force should be obtained in advance. More specifically, an electric field distribution is calculated based on a potential distribution obtained by solving the basic equations and a line of electric force is traced with respect to the obtained electric field distribution to obtain a desired line of electric force. The electric field then is a vector quantity having a value on a nodal point of a mesh used for solving the basic equations. Conventional device simulation methods for obtaining lines of electric force are disclosed, for example, in the literature "Personal Computer Electromagnetics" (Takehiko Adachi, Hitoshi Sekimoto, Yasuaki Watanabe, Asakura Books, 1986, pp. 30–31) and the literature "Simulation of Electromagnetic Phenomenon Learned by Personal Computer" (Noriyuki Kitahara, Shinnichi Hirata, Morikita Publishing, 1991, pp. 12–13). The conventional device simulation methods recited in these literatures simply interpolate and trace values of electric fields based on a value of an electric field on each nodal point of the mesh.

FIG. 16 is a flow chart showing a conventional device simulation method. With reference to FIG. 16, the conventional device simulation method includes Step 1603 for conducting interpolation based on electric fields at both end points of a mesh edge where the point "$m_i$" (i=1, 2, 3, ... ) is located to obtain a search direction vector "$dmV_i$" (hereinafter denoted as "$dm_i$") of the line of electric force, Step 1604 for extending a line segment from the point "$m_i$" in the direction of the search direction vector "$dm_i$" of the line of electric force to obtain a point "$m_{i+1}$" of intersection between the line segment and a mesh edge, and Step 1605 for determining whether the intersection point reaches the end point of the line of electric force.

With reference to the flow chart illustrated in FIG. 16 and FIG. 17 which schematically shows a processing procedure according to the conventional device simulation method, operation of the conventional device simulation method will be described. Triangular meshes represented by dotted lines in FIG. 17 are a part of the meshes to be used for solving the basic equations. Electric field at each mesh nodal point "$n_i$" (i=1–9) is represented by vector "$E(EV)n_i$" (i=1–9). Under the initial conditions, a point "$m_1$" on the mesh edge "$n_1n_2$" is regarded as a starting point of a line of electric force.

First, calculate a search direction vector of the line of electric force (Step 1603). In a case where the line of electric force is traced in the forward direction, that is, in the potential gradient descending direction, a search direction vector "$dm_1$" of the line of electric force at the starting point "$m_1$" will be obtained by the following expressions through linear interpolation of the electric field "$Em_1$" from the vectors "$En_1$" and "$En_2$" to "$m_1$".

$$E_{m1} = \frac{l_{n2m1}E_{n1} + l_{n1m1}E_{n2}}{l_{n1n2}} \tag{16}$$

$$d_{m1} = \frac{E_{m1}}{|E_{m1}|} \tag{17}$$

where $l_{n1n2}$ represents a length of a mesh edge between $n_1$ and $n_2$, $l_{n1m1}$ represents a length of a mesh edge between $n_1$ and $m_1$ and $l_{n2m1}$ represents a length of a mesh edge between $n_2$ and $m_1$.

Next, find a point "$m_2$" at which a line segment extended from the starting point "$m_1$" in the direction of the search direction vector "$dm_1$" of the line of electric force intersects with a mesh edge (Step 1604). In FIG. 17, this intersection point "$m_2$" is located on the mesh edge $n_2n_4$. Then, determine whether the point "$m_2$" is the end point of the line of electric force (Step 1605). Next, find a search direction vector "$dm_2$" of the line of electric force at the point "$m_2$" and find a point "$m_3$" at which a line segment extended in the direction of the vector intersects with a mesh edge. Then, determine whether the point "$m_3$" is the end point of the line of electric force (Step 1605).

Points "$m_4$", "$m_5$", "$m_6$" and "$m_7$" can be found in the same manner. As a result, such a line of electric force "$m_1$, $m_2$, $m_3$, $m_4$, $m_5$, $m_6$, $m_7$" as illustrated in the figure is obtained. Every time each point is obtained, determination is made whether the point is the end point of the line electric force or not and if, for example, the point "$m_7$" is the end point, processing is completed. At Step 1605, the point as an object of the determination is regarded as reaching the end point of the line of electric force when a traced line of electric force reaches an outline part of the meshes or when an electric field becomes weak as the potential distribution goes flat.

When the line of electric force is traced in the reverse direction from the starting point, calculation is made by the following expression, with a sign of a search direction vector of the line of electric force changed.

$$d_{m1} = -\frac{E_{m1}}{|E_{m1}|} \tag{18}$$

Description will be next made of processing to be conducted according to the conventional device simulation method when a device as an object of simulation includes an electric field drastically varying region, with reference to FIG. 18(A) and (B) which schematically show the processing procedures. In the figures, a linear part represented by a chain dotted line is a valley-formed potential part where the potential changes in the form of a valley. Such drastic change of electric field occurs, for example, in the vicinity of a drain right under a gate oxide film when a voltage is applied across a gate and a drain in a MOS transistor. Also at a region where such electric field changes as shown in FIG. 18(A) occurs, like the case described with reference to FIG. 17, a search direction vector "$dm_1$" of the line of electric force is first calculated regarding a point "$m_1$" as a starting point of a line of electric force to find a point "$m_2$" at which a line segment extended in the direction of the vector "$dm_1$" intersects with a mesh edge. Next, find a search direction vector "$dm_2$" of the line of electric force at the point "$m_2$" to find a point "$m_3$" at which the line segment extended in the direction of the vector intersects with a mesh edge. By tracing "$m_4$", "$m_5$", "$m_6$", "$m_7$", "$m_8$" and "$m_9$" in the same manner, a line of electric force $m_1$, $m_2$, $m_3$, $m_4$, $m_5$, $m_6$, $m_7$, $m_8$ and $m_9$ is obtained.

In this example, the line of electric force is obtained as a line fluctuating with the valley-formed potential part in between. Actual line of electric force, however, extends along the valley-formed potential part after reaching the point "$m_2$" of intersection with the valley-formed potential part, as represented by the solid line in FIG. 18(B). The line of electric force to be used in numerical calculation will be $m_1$, $m_2$, $m_3$ represented by the solid line. When numerical calculation is made along such a line of electric force fluctuating as shown in FIG. 18(A) and obtained by the conventional device simulation method, calculation error would be therefore increased.

The reason here for using in numerical calculation not the line of electric force represented by the two dot chain line which is an actual line of electric force but the line of electric force represented by the solid line which is an approximate line of electric force is that the latter makes calculation speed higher and data handling in a program easier than the former does. Moreover, since a unit of discretization is specified by a mesh generated at a semiconductor device, such approximation as represented by the solid line in FIG. 18(B) will involve no serious calculation error in ionization integration calculation.

As described in the foregoing, the conventional device simulation method has a shortcoming that when a device to be simulated includes an electric field drastically changing portion such as a valley-formed potential part, a search direction vector of a line of electric force fluctuates, so that an incorrect line of electric force is recognized to increase calculation error.

SUMMARY OF THE INVENTION

An object of the present invention is to solve the above-described problems and provide a device simulation method in which, when a semiconductor device includes an electric field drastically changing portion, a line of electric force is prevented from zigzagging due to fluctuation in search direction to enable smooth tracing of the line at the portion in question, thereby realizing highly precise simulation.

According to one aspect of the invention, a device simulation method of executing the processing for recognizing a line of electric force for use in numerical analyses of a semiconductor device as an object of processing through tracing of a point on a mesh edge of an analysis mesh generated on the semiconductor device, comprises a line of electric force calculating step of calculating a search direction vector based on predetermined rules, with a predetermined point set on a mesh edge of the analysis mesh or within the analysis mesh as a starting point, linking the starting point of the search direction vector with a point set on a straight line extending in the direction of the search direction vector based on predetermined rules, and repeating, as necessary, the processing for calculating a search direction vector, with the newly set point as a starting point, and the processing for linking the starting point of the calculated search direction vector with a newly set point; and a line of electric force subdividing step of setting, as necessary, a new point on a line segment linking the starting point of the search direction vector set at the line of electric force calculating step and the newly set point, further repeating, as necessary, the processing for setting another new point on the line segment linking the starting point of the search direction vector and the newly set point to shorten the line segment, and when a predetermined condition is satisfied, replacing the point newly set at the line of electric force calculating step with a point lastly set at the time when the predetermined condition is satisfied, to return the routine to the line of electric force calculating step.

In the preferred construction, the line of electric force calculating step comprises first step of calculating a search direction vector, with a predetermined point as a starting point, second step of obtaining an intersection point between a straight line extending in the direction of the search direction vector calculated at the first step and a mesh edge, third step of calculating a search direction vector, with the point on the mesh edge obtained at the second step as a starting point, fourth step of determining whether an angle between the straight line extending in the direction of the search direction vector calculated at the first step and the search direction vector calculated at the third step is more than a preset upper limit value, and if so, proceeding to the line of electric force subdividing step, and fifth step of determining, when the angle between the straight line and the search direction vector is not more than the upper limit value at the determination of the fourth step, whether the point on the mesh edge obtained at the second step is the end point of the line of electric force in the analysis mesh, and if it is the end point of the line of electric force, completing the processing and if not, replacing the search direction vector calculated at the first step with the search direction vector calculated at the third step to return the routine to the second step.

In the preferred construction, the line of electric force subdividing step comprises first step of setting, on the line segment linking the starting point of the search direction vector obtained at the line of electric force calculating step with the point set on the straight line extending from the starting point in the direction of the search direction vector, a subdividing point for shortening the line segment based on predetermined rules, second step of calculating a search direction vector, with the subdividing point set at the first step as a starting point, third step of determining whether an angle between the straight line extending in the direction of the search direction vector at the first step and the search direction vector calculated at the second step is more than a preset upper limit value, and when the angle is more than the value, repeating the processing for setting a subdividing point which will further shorten the line segment linking the starting point of the search direction vector at the first step with the subdividing point set at the first step until the angle has a value smaller than the upper limit value, and fourth step of replacing the subdividing point set at the first step with a subdividing point lastly set at the third step to return the routine to the line of electric force calculating step.

In another preferred construction, the line of electric force calculating step comprises first step of calculating a search direction vector, with a predetermined point as a starting point, second step of obtaining an intersection point between a straight line extending in the direction of the search direction vector calculated at the first step and a mesh edge, third step of calculating a search direction vector, with the point on the mesh edge obtained at the second step as a starting point, fourth step of determining whether an angle between the straight line extending in the direction of the search direction vector calculated at the first step and the search direction vector calculated at the third step is more than a preset upper limit value, and if so, proceeding to the line of electric force subdividing step, and fifth step of determining, when the angle between the straight line and the search direction vector is not more than the upper limit value at the determination of the fourth step, whether the point on the mesh edge obtained at the second step is the end point of the line of electric force in the analysis mesh, and if it is the end point of the line of electric force, completing the processing and if not, replacing the search direction vector calculated at the first step with the search direction vector calculated at the third step to return the routine to the second step, and the line of electric force subdividing step comprises sixth step of setting, on the line segment linking the starting point of the search direction vector calculated at the first or third step of the line of electric force calculating step with the point set on the straight line extending from the starting point in the direction of the search direction vector, a subdividing point for shortening the line segment based on predetermined rules, seventh step of calculating a search direction vector, with the subdividing point set at the sixth step as a starting point, eighth step of determining whether an angle between the straight line extending in the direction of the search direction vector at the sixth step and the search direction vector calculated at the seventh step is more than a preset upper limit value, and when the angle is more than the value, repeating the processing for setting a subdividing point which will further shorten the line segment linking the starting point of the search direction vector at the sixth step with the subdividing point set at the sixth step until the angle has a value smaller than the upper limit value, and ninth step of replacing the subdividing point set at the sixth step with a subdividing point lastly set at the eighth step to return the routine to the line of electric force calculating step.

In another preferred construction, the line of electric force subdividing step comprises first step of setting, on the line segment linking the starting point of the search direction vector obtained at the line of electric force calculating step with the point set on the straight line extending from the starting point in the direction of the search direction vector, a subdividing point for shortening the line segment based on predetermined rules, second step of calculating a search direction vector, with the subdividing point set at the first step as a starting point, as well as calculating a mean vector of search direction vectors set so far and taking the mean vector as a search direction vector with the subdividing point as a starting point when the number of times of setting of subdividing points set at the first step exceeds a predetermined number, third step of determining whether an angle between the straight line extending in the direction of the search direction vector at the first step and the search direction vector calculated at the second step is more than a preset upper limit value, and when the angle is more than the value, repeating the processing for setting a subdividing point which will further shorten the line segment linking the starting point of the search direction vector at the first step with the subdividing point set at the first step until the angle has a value smaller than the upper limit value, and fourth step of replacing the subdividing point set at the first step with a subdividing point lastly set at the third step to return the routine to the line of electric force calculating step.

In another preferred construction, the line of electric force calculating step comprises first step of calculating a search direction vector, with a predetermined point as a starting point, second step of obtaining an intersection point between a straight line extending in the direction of the search direction vector calculated at the first step and a mesh edge, third step of calculating a search direction vector, with the point on the mesh edge obtained at the second step as a starting point, fourth step of determining whether an angle between the straight line extending in the direction of the search direction vector calculated at the first step and the search direction vector calculated at the third step is more than a preset upper limit value, and if so, proceeding to the line of electric force subdividing step, and fifth step of determining, when the angle between the straight line and the search direction vector is not more than the upper limit value at the determination of the fourth step, whether the point on the mesh edge obtained at the second step is the end point of the line of electric force in the analysis mesh, and if it is the end point of the line of electric force, completing the processing and if not, replacing the search direction vector calculated at the first step with the search direction vector calculated at the third step to return the routine to the second step, and the line of electric force subdividing step comprises sixth step of setting, on the line segment linking the starting point of the search direction vector calculated at the first or third step of the line of electric force calculating step with the point set on the straight line extending from the starting point in the direction of the search direction vector, a subdividing point for shortening the line segment based on predetermined rules, seventh step of calculating a search direction vector, with the subdividing point set at the sixth step as a starting point, as well as calculating a mean vector of search direction vectors set so far and taking the mean vector as a search direction vector with the subdividing point as a starting point when the number of times of setting of subdividing points set at the first step exceeds a predetermined number, eighth step of determining whether an angle between the straight line extending in the direction of the search direction vector at the sixth step and the search direction vector calculated at the seventh step is more than a preset upper limit value, and when the angle is more than the value, repeating the processing for setting a subdividing point which will further shorten the line segment linking the starting point of the search direction vector at the sixth step with the subdividing point set at the sixth step until the angle has a value smaller than the upper limit value, and ninth step of replacing the subdividing point set at the sixth step with a subdividing point lastly set at the eighth step to return the routine to the line of electric force calculating step.

According to another aspect of the invention, in a computer readable memory storing a computer program for controlling a device simulator which is implemented by a computer system and executes the processing for tracing a point on a mesh edge of an analysis mesh generated on a semiconductor device as an object of processing to recognize a line of electric force for use in numerical analyses of the semiconductor device, the computer program comprises a line of electric force calculating step of calculating a search direction vector based on predetermined rules, with a predetermined point set on a mesh edge of the analysis mesh or within the analysis mesh as a starting point, linking the starting point of the search direction vector with a point set on a straight line extending in the direction of the search direction vector based on predetermined rules, and repeating, as necessary, the processing for calculating a search direction vector, with the newly set point as a starting point, and the processing for linking the starting point of the calculated search direction vector with a newly set point; and a line of electric force subdividing step of setting, as necessary, a new point on a line segment linking the starting point of the search direction vector set at the line of electric force calculating step and the newly set point, further repeating, as necessary, the processing for setting another new point on the line segment linking the starting point of the search direction vector and the newly set point to shorten the line segment, and when a predetermined condition is satisfied, replacing the point newly set at the line of electric force calculating step with a point lastly set at the time when the predetermined condition is satisfied, to return the routine to the line of electric force calculating step.

In the preferred construction, in the computer program, the line of electric force calculating step comprises first step of calculating a search direction vector, with a predetermined point as a starting point, second step of obtaining an intersection point between a straight line extending in the direction of the search direction vector calculated at the first step and a mesh edge, third step of calculating a search direction vector, with the point on the mesh edge obtained at the second step as a starting point, fourth step of determining whether an angle between the straight line extending in the direction of the search direction vector calculated at the first step and the search direction vector calculated at the third step is more than a preset upper limit value, and if so, proceeding to the line of electric force subdividing step, and fifth step of determining, when the angle between the straight line and the search direction vector is not more than the upper limit value at the determination of the fourth step, whether the point on the mesh edge obtained at the second step is the end point of the line of electric force in the analysis mesh, and if it is the end point of the line of electric force, completing the processing and if not, replacing the search direction vector calculated at the first step with the search direction vector calculated at the third step to return the routine to the second step.

In another preferred construction, in the computer program, the line of electric force subdividing step comprises first step of setting, on the line segment linking the starting point of the search direction vector obtained at the line of electric force calculating step with the point set on the straight line extending from the starting point in the direction of the search direction vector, a subdividing point for shortening the line segment based on predetermined rules, second step of calculating a search direction vector, with the subdividing point set at the first step as a starting point, third step of determining whether an angle between the straight line extending in the direction of the search direction vector at the first step and the search direction vector calculated at the second step is more than a preset upper limit value, and when the angle is more than the value, repeating the processing for setting a subdividing point which will further shorten the line segment linking the starting point of the search direction vector at the first step with the subdividing point set at the first step until the angle has a value smaller than the upper limit value, and fourth step of replacing the subdividing point set at the first step with a subdividing point lastly set at the third step to return the routine to the line of electric force calculating step.

In another preferred construction, in the computer program, the line of electric force calculating step comprises first step of calculating a search direction vector, with a predetermined point as a starting point, second step of obtaining an intersection point between a straight line extending in the direction of the search direction vector calculated at the first step and a mesh edge, third step of calculating a search direction vector, with the point on the mesh edge obtained at the second step as a starting point, fourth step of determining whether an angle between the straight line extending in the direction of the search direction vector calculated at the first step and the search direction vector calculated at the third step is more than a preset upper limit value, and if so, proceeding to the line of electric force subdividing step, and fifth step of determining, when the angle between the straight line and the search direction vector is not more than the upper limit value at the determination of the fourth step, whether the point on the mesh edge obtained at the second step is the end point of the line of electric force in the analysis mesh, and if it is the end point of the line of electric force, completing the processing and if not, replacing the search direction vector calculated at the first step with the search direction vector calculated at the third step to return the routine to the second step, and the line of electric force subdividing step comprises sixth step of setting, on the line segment linking the starting point of the search direction vector calculated at the first or third step of the line of electric force calculating step with the point set on the straight line extending from the starting point in the direction of the search direction vector, a subdividing point for shortening the line segment based on predetermined rules, seventh step of calculating a search direction vector, with the subdividing point set at the sixth step as a starting point, eighth step of determining whether an angle between the straight line extending in the direction of the search direction vector at the sixth step and the search direction vector calculated at the seventh step is more than a preset upper limit value, and when the angle is more than the value, repeating the processing for setting a subdividing point which will further shorten the line segment linking the starting point of the search direction vector at the sixth step with the subdividing point set at the sixth step until the angle has a value smaller than the upper limit value, and ninth step of replacing the subdividing point set at the sixth step with a subdividing point lastly set at the eighth step to return the routine to the line of electric force calculating step.

In this case, in the computer program, the line of electric force subdividing step comprises first step of setting, on the line segment linking the starting point of the search direction vector obtained at the line of electric force calculating step with the point set on the straight line extending from the starting point in the direction of the search direction vector, a subdividing point for shortening the line segment based on predetermined rules, second step of calculating a search direction vector, with the subdividing point set at the first step as a starting point, as well as calculating a mean vector of search direction vectors set so far and taking the mean vector as a search direction vector with the subdividing point as a starting point when the number of times of setting of subdividing points set at the first step exceeds a predetermined number, third step of determining whether an angle between the straight line extending in the direction of the search direction vector at the first step and the search direction vector calculated at the second step is more than a preset upper limit value, and when the angle is more than the value, repeating the processing for setting a subdividing point which will further shorten the line segment linking the starting point of the search direction vector at the first step with the subdividing point set at the first step until the angle has a value smaller than the upper limit value, and fourth step of replacing the subdividing point set at the first step with a subdividing point lastly set at the third step to return the routine to the line of electric force calculating step.

Also, in the computer program, the line of electric force calculating step comprises first step of calculating a search direction vector, with a predetermined point as a starting point, second step of obtaining an intersection point between a straight line extending in the direction of the search direction vector calculated at the first step and a mesh edge, third step of calculating a search direction vector, with the point on the mesh edge obtained at the second step as a starting point, fourth step of determining whether an angle between the straight line extending in the direction of the search direction vector calculated at the first step and the search direction vector calculated at the third step is more than a preset upper limit value, and if so, proceeding to the line of electric force subdividing step, and fifth step of determining, when the angle between the straight line and the search direction vector is not more than the upper limit value at the determination of the fourth step, whether the point on the mesh edge obtained at the second step is the end point of the line of electric force in the analysis mesh, and if it is the end point of the line of electric force, completing the processing and if not, replacing the search direction vector calculated at the first step with the search direction vector calculated at the third step to return the routine to the second step, and the line of electric force subdividing step comprises sixth step of setting, on the line segment linking the starting point of the search direction vector calculated at the first or third step of the line of electric force calculating step with the point set on the straight line extending from the starting point in the direction of the search direction vector, a subdividing point for shortening the line segment based on predetermined rules, seventh step of calculating a search direction vector, with the subdividing point set at the sixth step as a starting point, as well as calculating a mean vector of search direction vectors set so far and taking the mean vector as a search direction vector with the subdividing point as a starting point when the number of times of setting of subdividing points set at the first step exceeds a predetermined number, eighth step of determining whether an angle between the straight line extending in the direction of the search direction vector at the sixth step and the search direction vector calculated at the seventh step is more than a preset upper limit value, and when the angle is more than the value, repeating the processing for setting a subdividing point which will further shorten the line segment linking the starting point of the search direction vector at the sixth step with the subdividing point set at the sixth step until the angle has a value smaller than the upper limit value, and ninth step of replacing the subdividing point set at the sixth step with a subdividing point lastly set at the eighth step to return the routine to the line of electric force calculating step.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The device simulation method of the present invention is implemented by a workstation or other computer system and is executed by a device simulator which conducts numerical analyses of a semiconductor device. Function executing means for executing individual processing of the present invention is implemented by program-controlled CPU and RAM or other memory. A computer program for controlling a CPU is presented as stored in a magnetic disk, a semiconductor memory or other storage medium.

Figure 1:
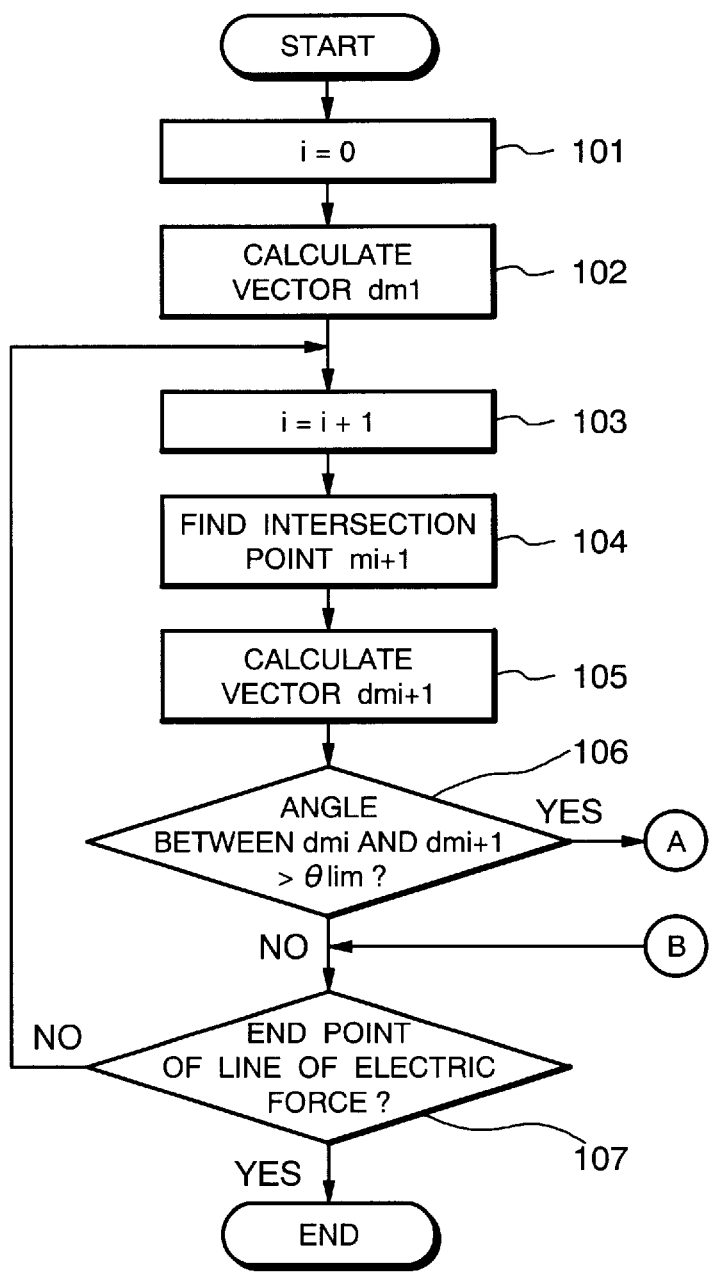
FIG. 1 is a flow chart of a device simulation method according to a first embodiment of the present invention which shows ordinary operation.
Figure 2:
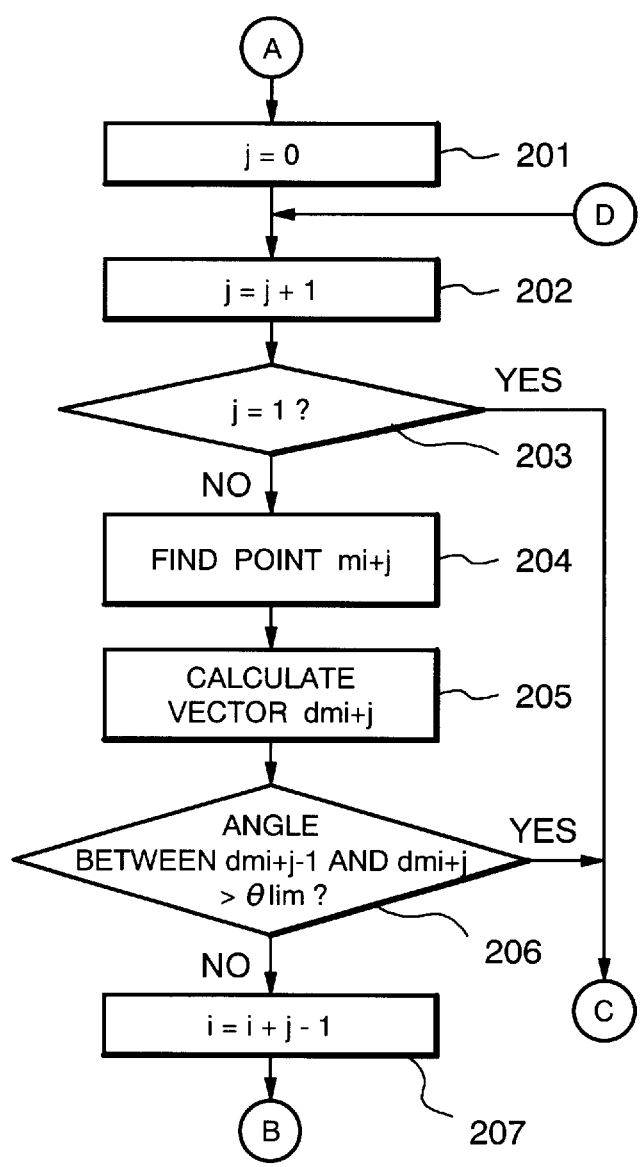
FIG. 2 is a flow chart of a device simulation method according to the first embodiment of the present invention which shows operation of the first stage for subdividing an element of an analysis mesh.
Figure 3:
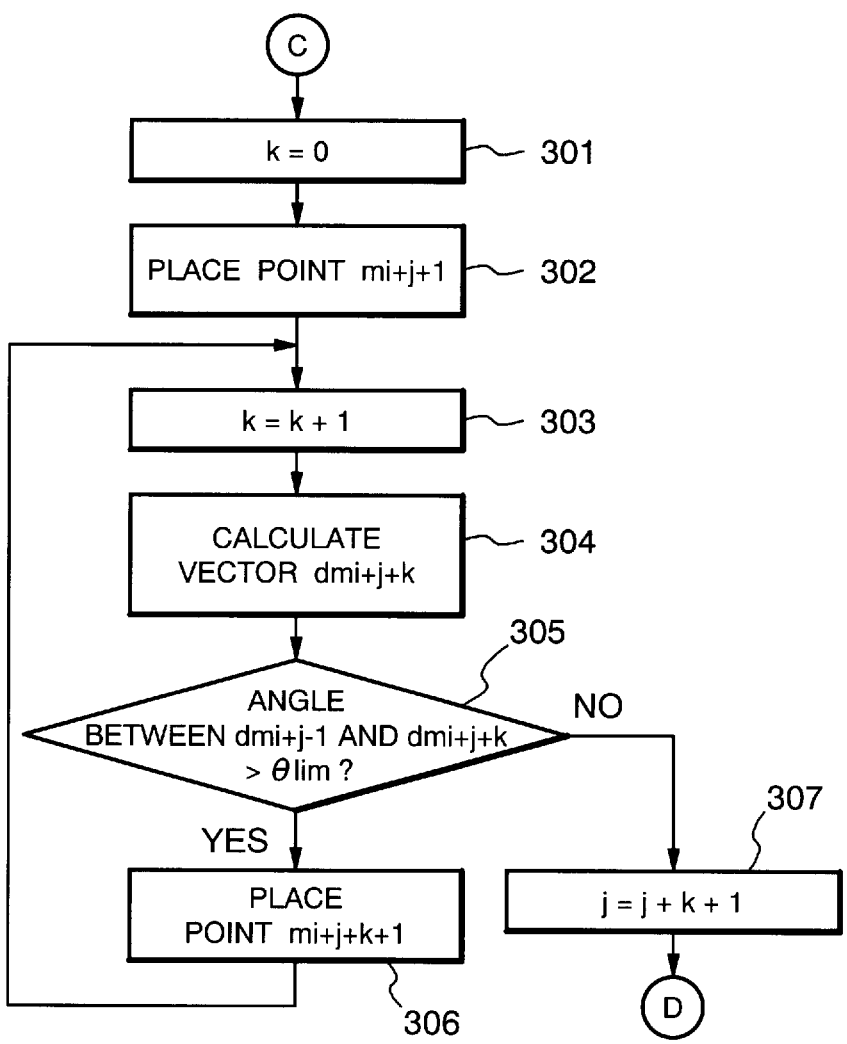
FIG. 3 is a flow chart of a device simulation method according to the first embodiment of the present invention which shows operation of the second stage for subdividing an element of an analysis mesh.

FIGS. 1 to 3 are flow charts illustrating a device simulation method according to a first embodiment of the present invention.

With reference to these figures, a search direction vector "$dm_1$" of a line of electric force at a starting point "$m_1$" is first calculated in the device simulation method of the present embodiment (FIG. 1, Steps 101 and 102). Calculation manner of the search direction vector "$dm_1$" is the same as that of conventional techniques. More specifically, when the line of electric force is traced, for example, in the forward direction, the search direction vector "$dm_1$" of the line of electric force at the starting point "$m_1$" can be obtained by the above-described equations (16) and (17) through linear interpolation of an electric field "$Em_1$" from vectors "$En_1$" and "$En_2$" to "$m_1$".

Next, find a point "$m_{i+1}$" at which a line segment extended from a point "$m_i$" ($i=1,2,3,\ldots$) in the direction of a search direction vector "$dm_i$" of the line of electric force intersects with a mesh edge (Steps 103 and 104). Then calculate a search direction vector "$dm_{i+1}$" at the point "$m_{i+1}$" (Step 105). Right after the calculation of the search direction vector "$dm_1$" at Step 102, a point "$m_2$" and a search direction vector "$dm_2$" are obtained at Steps 104 and 105.

Next, calculate an angle between the obtained search direction vectors "$dm_i$" and "$dm_{i+1}$" and compare the calculation result with a present upper limit angle "$\theta_{lim}$" (Step 106). When the angle between the search direction vectors "$dm_i$" and "$dm_{i+1}$" is not larger than the upper limit angle "$\theta_{lim}$", determine whether the point "$m_{i+1}$" obtained at Step 104 is the end point of the line of electric force or not (Step 107), and if it is the end point, complete the processing and if not, replace "i+1" with "i" (Step 103) and find a point "$m_{i+1}$" at which a line segment extended from the point "$m_i$" in the direction of the search direction vector "$dm_i$" of the line of electric force intersects with a mesh edge (Step 104).

On the contrary, when the angle between the search direction vectors "$dm_i$" and "$dm_{i+1}$" is larger than the upper limit angle "$\Theta_{lim}$", find a point "$m_{i+j}$" ($j=1,2,3,\ldots$) (FIG. 2, Steps 201–204). Then, calculate a search direction vector "$dm_{i+j}$" at the point "$m_{i+j}$" (Step 205).

Next, calculate an angle between a search direction vector "$dm_{i+j-1}$" and the search direction vector "$dm_{i+j}$" and compare the calculation result with the upper limit angle "$\theta_{lim}$" (Step 206). When the angle between the search direction vectors "$dm_{i+j-1}$" and "$dm_{i+j}$" is not larger than the upper limit angle "$\theta_{lim}$", replace "i+j-1" with "i" (Step 207) to proceed to determination of the end point of the line of electric force at Step 107 shown in FIG. 1.

On the contrary, when the angle between the search direction vectors "$dm_{i+j-1}$" and "$dm_{i+j}$" is larger than the upper limit angle "$\theta_{lim}$", place a point "$m_{i+j+1}$" on a line segment linking the point "$m_i$" and the point "$m_{i+j}$" (FIG. 3, Steps 301 and 302) to calculate a search direction vector "$dm_{i+j+k}$" ($k=1,2,3,\ldots$) (Steps 303 and 304). In the operation shown in FIG. 2, if j=1 (Steps 201–203), the routine proceeds to the processing at Step 301 of FIG. 3 without the execution of the processing of Step 204 and the following steps.

Next, calculate an angle between the search direction vector "$dm_{i+j-1}$" and the search direction vector "$dm_{i+j+k}$" and compare the calculation result with the upper limit angle "$\theta_{lim}$" (Step 305). If the angle between the search direction vector "$dm_{i+j-1}$" and the search direction vector "$dm_{i+j+k}$" is not larger than the upper limit angle "$\theta_{lim}$", replace "j+k-1" with "j" (Step 307) and proceed to the updating processing of "j" at Step 202 of FIG. 2.

On the contrary, if the angle between the search direction vectors "$dm_{i+j-1}$" and "$dm_{i+j+k}$" is larger than the upper limit angle "$\theta_{lim}$", subdivide a section between the point "$m_{i+j-1}$" and the point "$m_{i+j+k}$" to place a point "$m_{i+j+k+1}$" (Step 306), and after returning to Step 303 to replace "k+1" with "k", newly calculate a search direction vector "$dm_{i+j+k}$" (Step 304).

Repeating the foregoing processing until reaching the end point of the line of electric force (FIG. 1, Step 107) leads to tracing of the line of electric force as an object path of numerical calculation in the simulation of a semiconductor device. As described above, tracing the line of electric force, with each small area of an analysis mesh subdivided for discretizing a region of a semiconductor device as an object of processing, enables accurate calculation even if the semiconductor device includes such an area where electric field drastically changes as a valley-formed potential portion.

Figure 4:
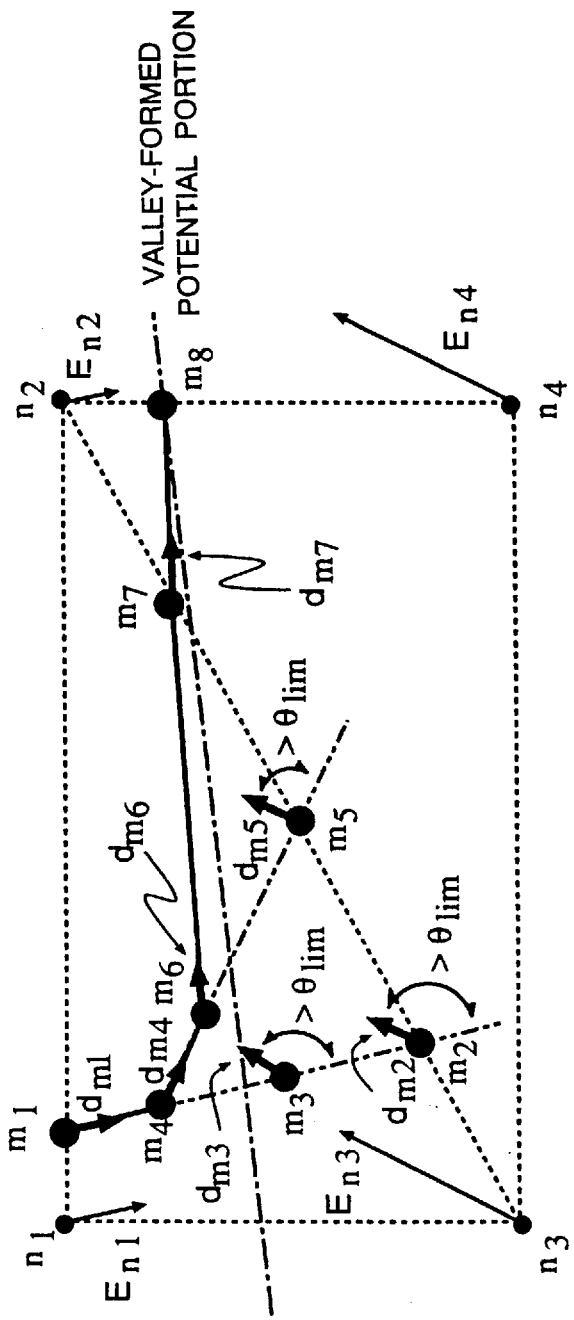
FIG. 4 is a schematic diagram showing a procedure of the line of electric force searching processing according to the first embodiment.

FIG. 4 is a diagram schematically showing the processing procedure of the present embodiment. A triangular mesh expressed by dotted lines in FIG. 4 represents a part of the meshes for use in solving the basic equations. In the following, operation of the processing according to the present embodiment will be specifically described with reference to the schematic diagram of FIG. 4 and the flow charts of FIGS. 1 to 3. In the following description, the line of electric force will be traced in the forward direction.

First, with respect to a starting point "$m_1$", calculate a search direction vector "$dm_1$" of a line of electric force (Step 102). Next, extend a line segment from the point "$m_1$" in the direction of the search direction vector "$dm_1$" to find an intersection point "$m_2$" with a mesh edge (Step 104). Then calculate a search direction vector "$dm_2$" at the point "$m_2$" (Step 105). Next, calculate an angle between the vector "$dm_1$" and the vector "$dm_2$" and compare the calculation result with a preset upper limit value "$\theta_{lim}$" (Step 106).

Since it is seen from FIG. 4 that the angle between the vector "$dm_1$" and the vector "$dm_2$" exceeds the upper limit value "$\theta_{lim}$", processing of FIGS. 2 and 3 is conducted for tracing the line of electric force, with the internal part of the mesh triangular element subdivided. At this time, "j=1" because of the first processing, so that the routine goes from Step 203 to the processing of FIG. 3.

First, place a point "$m_3$" on the line segment linking the point "$m_1$" and the point "$m_2$" (Step 302). The point "$m_3$" is set so as to satisfy the following equation, using a preset appropriate coefficient "$c_{lim}$" ($0 < c_{lim} < 1$).

$$l_{m_1 m_3} = c_{lim} \cdot l_{m_1 m_2} \tag{19}$$

where "$l_{m_1 m_3}$" and "$l_{m_1 m_2}$" represent lengths of line segments "$m_1 m_3$" and "$m_1 m_2$", respectively.

Next, calculate a search direction vector "$dm_3$" at the point "$m_3$" (Step 304). Since the point "$m_3$" is not a point on the mesh edge but a point within the mesh triangular element, the electric field at the point "$m_3$" is linearly interpolated based on the electric field at the vertex of the triangle according to the following equations (20) to (23) to obtain the vector "$dm_3$".

$$E_{m3} = E_{n1} + s\{(E_{n2} - E_{n1}) + t(E_{n3} - E_{n2})\} \tag{20}$$

$$s = \frac{(x_{m3} - x_{n1})(y_{n3} - y_{n2}) - (y_{m3} - y_{n1})(x_{n3} - x_{n2})}{(x_{m3} - x_{n1})(y_{n3} - y_{n2}) + (y_{m3} - y_{n1})(x_{n3} - x_{n2})} \tag{21}$$

$$t = \frac{(x_{m3} - x_{n1})(y_{n3} - y_{n2}) - (y_{m3} - y_{n1})(x_{n3} - x_{n2})}{-(x_{m3} - x_{n1})(y_{n3} - y_{n2}) + (y_{m3} - y_{n1})(x_{n3} - x_{n2})} \tag{22}$$

$$d_{m3} = -\frac{E_{m3}}{|E_{m3}|} \tag{23}$$

Next, determine whether the angle between the search direction vector "$dm_1$" and the search direction vector "$dm_3$" exceeds the upper limit value "$\theta_{lim}$" (Step 305). When the angle exceeds the value, subdivide the section between the point "$m_1$" and the point "$m_3$" and place a point "$m_4$" so as to prevent the angle between the two vectors from exceeding the upper limit value "$\theta_{lim}$" (Step 306).

Next, extend the line segment from the point "$m_4$" in the direction of a search direction vector "$dm_4$" to find an intersection point "$m_5$" with a mesh edge (Step 204). Then, calculate a search direction vector "$dm_5$" at the point "$m_5$" (Step 205) to determine whether the angle between the search direction vector "$dm_4$" and the search direction vector "$dm_5$" exceeds the upper limit value "$\theta_{lim}$" or not (Step 206). Since the angle exceeds the upper limit value "$\theta_{lim}$" here, such a point "$m_6$" is placed between the point "$m_4$" and the point "$m_5$" as will make the angle of search direction vectors not to exceed the upper limit value "$\theta_{lim}$" through the same operation as that for obtaining the point "$m_4$" (Steps 301–307). At this time, as a mesh element subdividing width, the previous subdividing width "$m_1m_4$" is first used and when the width fails to satisfy the conditions of the angle, the width is reduced by multiplying the width by the above-described coefficient "$c_{lim}$".

A point "$m_7$" is thereafter obtained in the same manner, resulting in having a smooth line of electric force "$m_1m_4m_6m_7$" without fluctuation within the triangular element "$n_1$", "$n_2$", "$n_3$" of this mesh. The obtained line of electric force "$m_1m_4m_6m_7$" is taken as the line of electric force in numerical calculation.

The same processing will be further conducted one after another with respect to each mesh triangular element to obtain the entire line of electric force. In device simulation requiring numerical calculation along a line of electric force, a smooth and accurate line of electric force can be thus traced to improve accuracy of the simulation.

Figure 5:
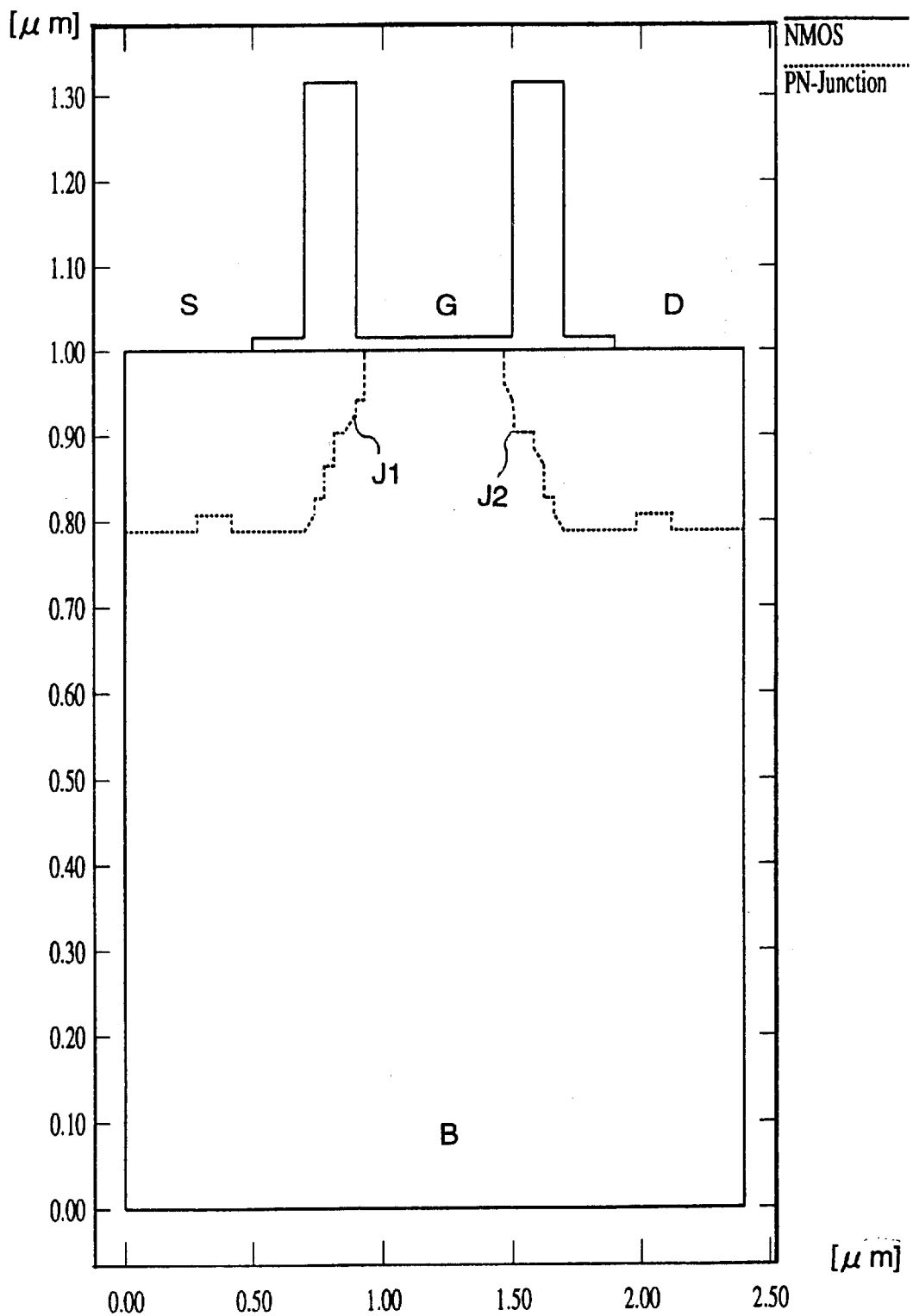
FIG. 5 is a sectional view schematically showing one example of a MOS device to be simulated.

FIG. 5 is a sectional view schematically showing one example of a MOS device as an object of device simulation according to the present embodiment. The MOS device illustrated in FIG. 5 includes a source electrode "S", a gate electrode "G", a drain electrode "D" and a substrate electrode "B". PN junction portions "J1" and "J2" are represented by dotted lines.

Figure 6:
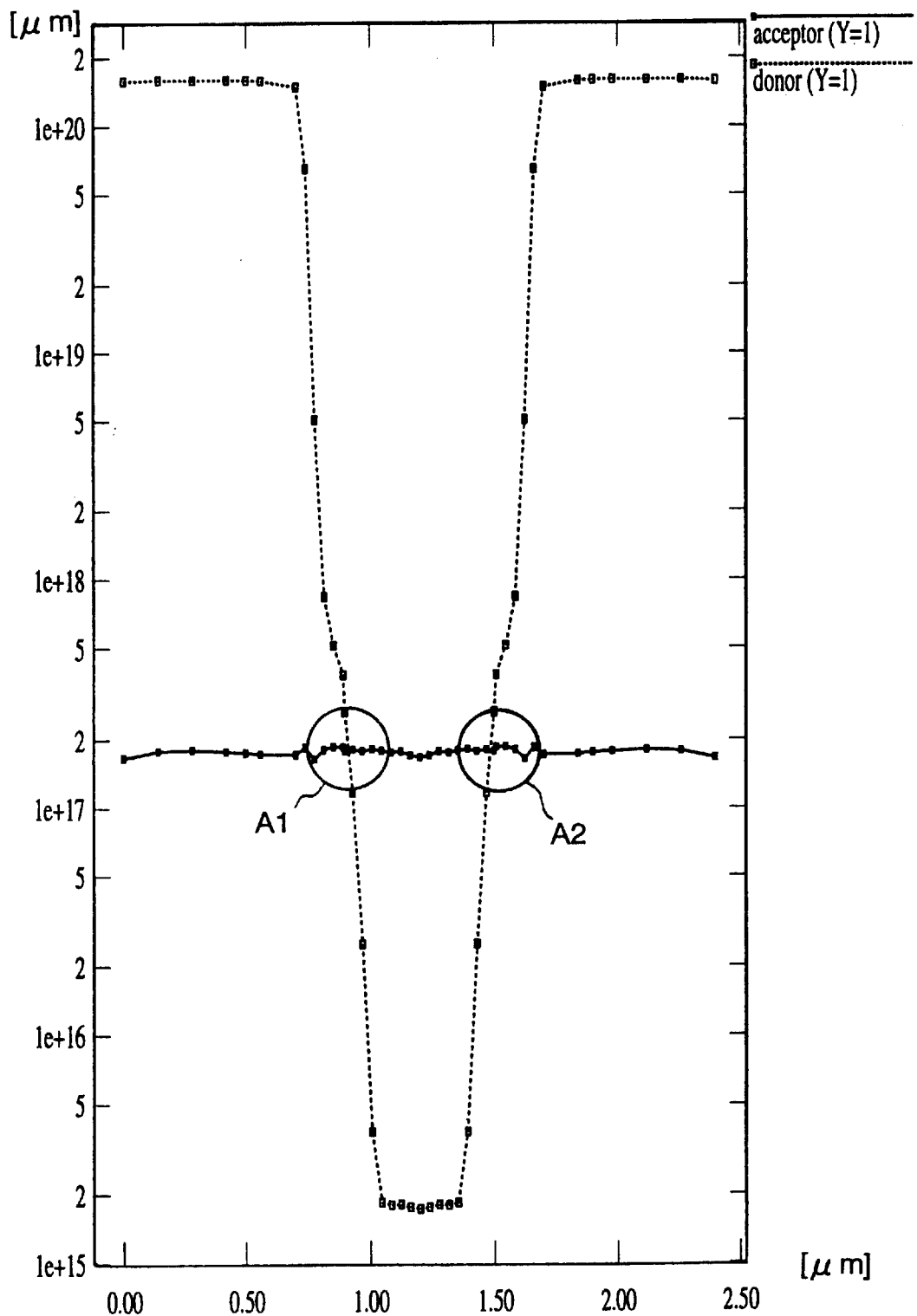
FIG. 6 is a diagram showing an impurity concentration distribution along the gate interface of the MOS device shown in FIG. 5.

FIG. 6 shows an impurity distribution at a gate oxide film interface of the MOS device illustrated in FIG. 5. In FIG. 6, the solid line represents an acceptor concentration and the dotted line represents a donor concentration. Impurity concentration drastically changing portions "A1" and "A2" are factors contributing to the generation of a valley-formed potential portion where the potential distribution drastically changes.

Figure 7:
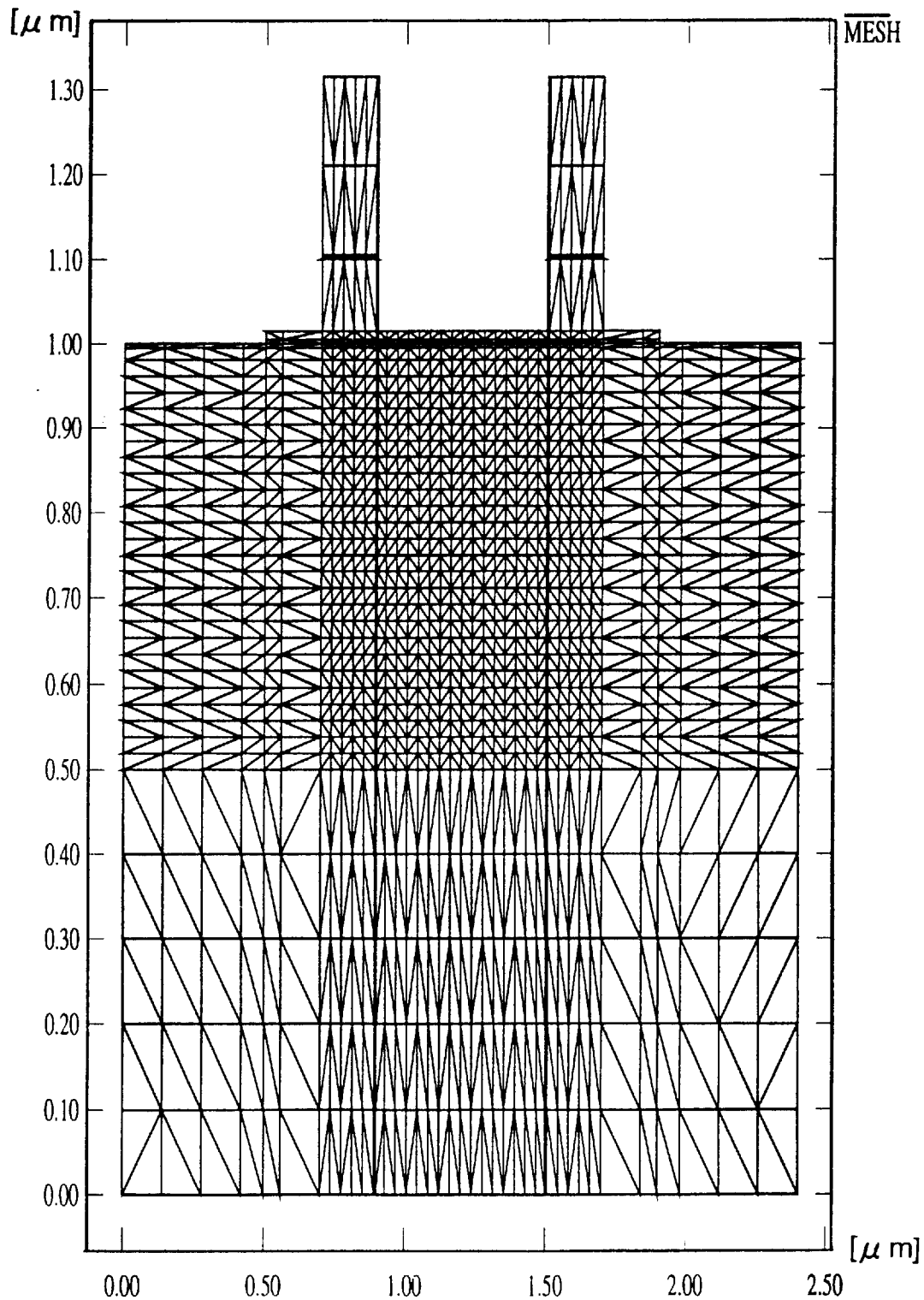
FIG. 7 is a diagram showing one example of an analysis mesh for use in simulation of the MOS device of FIG. 5.

FIG. 7 shows the state of triangular meshes generated at a MOS device as an object of processing for the purpose of conducting simulation. It is seen from FIG. 7 that in the vicinity of the gate electrode "G", meshes are minute.

Figure 8:
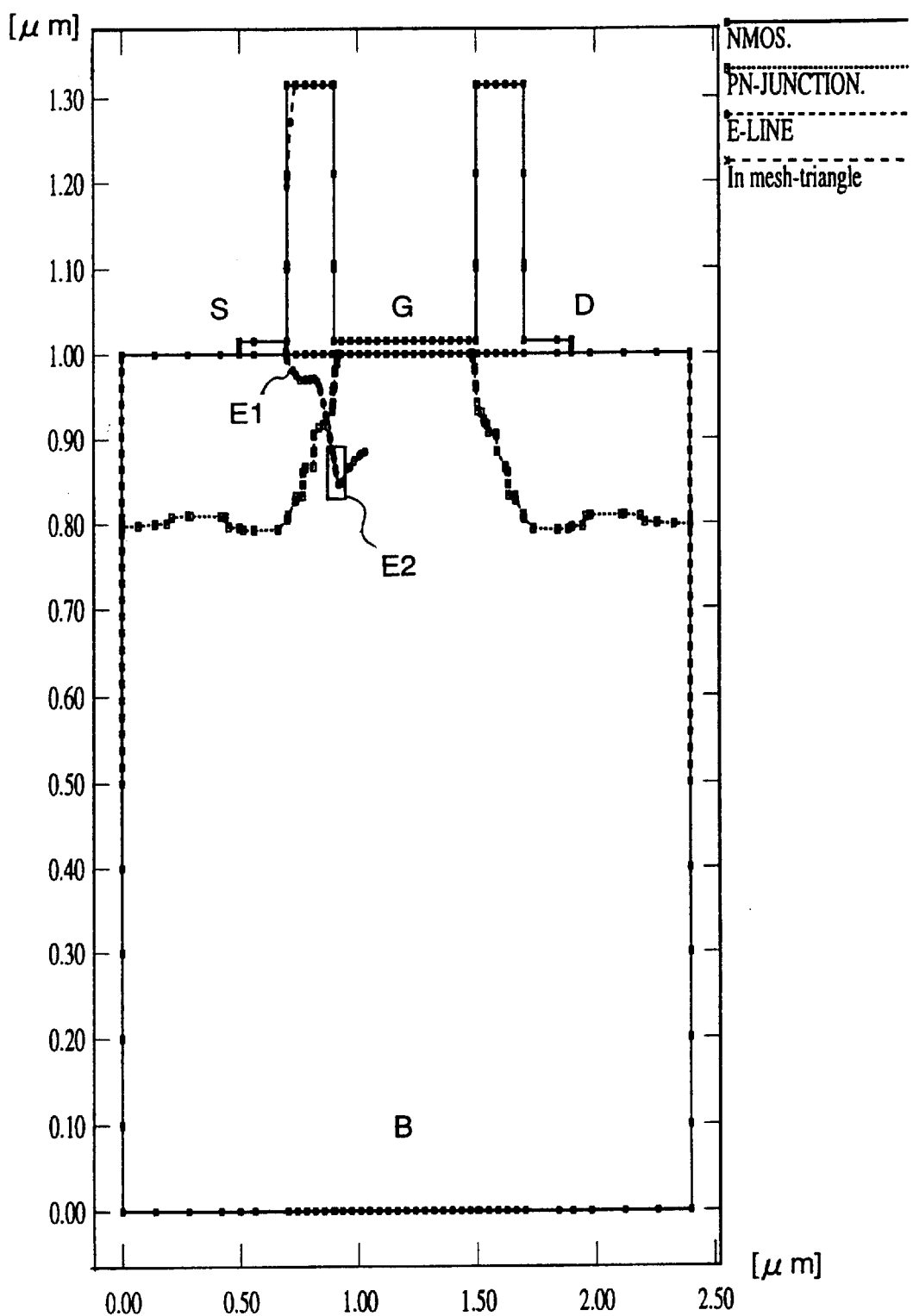
FIG. 8 is a diagram showing one example of a result obtained by applying the simulation according to the first embodiment to the MOS device of FIG. 5.

FIG. 8 shows an example of a line of electric force traced while analyzing the state where 0.0 V bias voltage is applied to the source electrode "S" of the MOS device in question, 2.0 V to the gate electrode "G", 2.0 V to the drain electrode "D" and 0.0 V to the substrate electrode "B". It is seen from FIG. 8 that with a point "E1" on the PN junction located at the edge of the source region selected as a starting point, the line of electric force is traced in the direction toward the inside of the substrate and in the direction toward the gate electrode through the gate oxide film.

Figure 9:
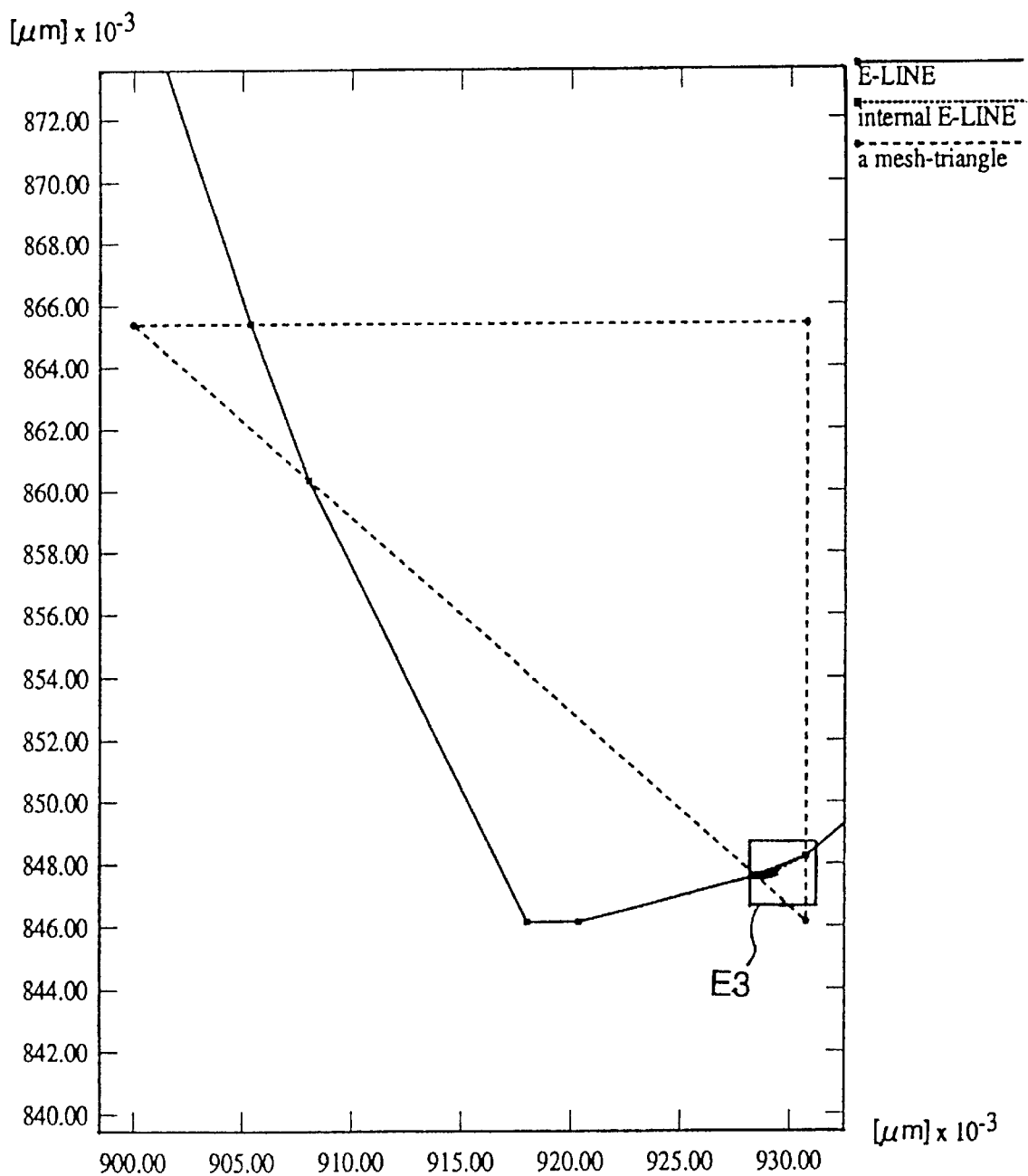
FIG. 9 is an enlarged view of a main part of FIG. 8.

FIG. 9 is an enlarged view of a main part showing the expansion of a portion "E2" corresponding to the valley-formed potential portion, together with the line of electric force traced within the mesh triangular element. In FIG. 9, a triangle represented by a dotted line is a mesh triangular element.

Figure 10:
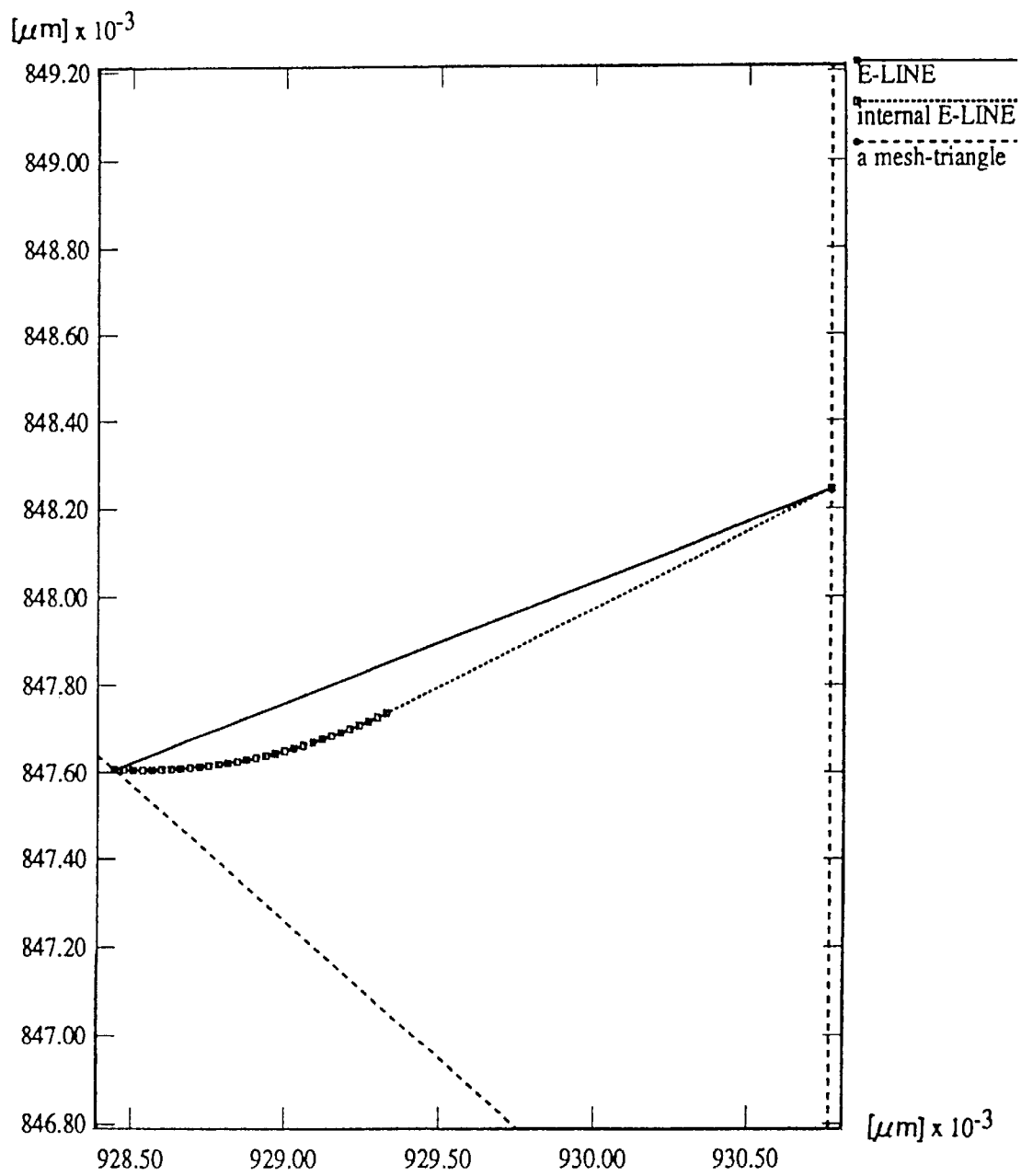
FIG. 10 is an enlarged view of a main part of FIG. 9.

FIG. 10 is an enlarged view of a main part showing the expansion of a portion "E3" of FIG. 9. It is seen from FIG. 10 that the line of electric force at the valley-formed potential portion can be smoothly traced.

Second embodiment of the present invention will be described.

Figure 11:
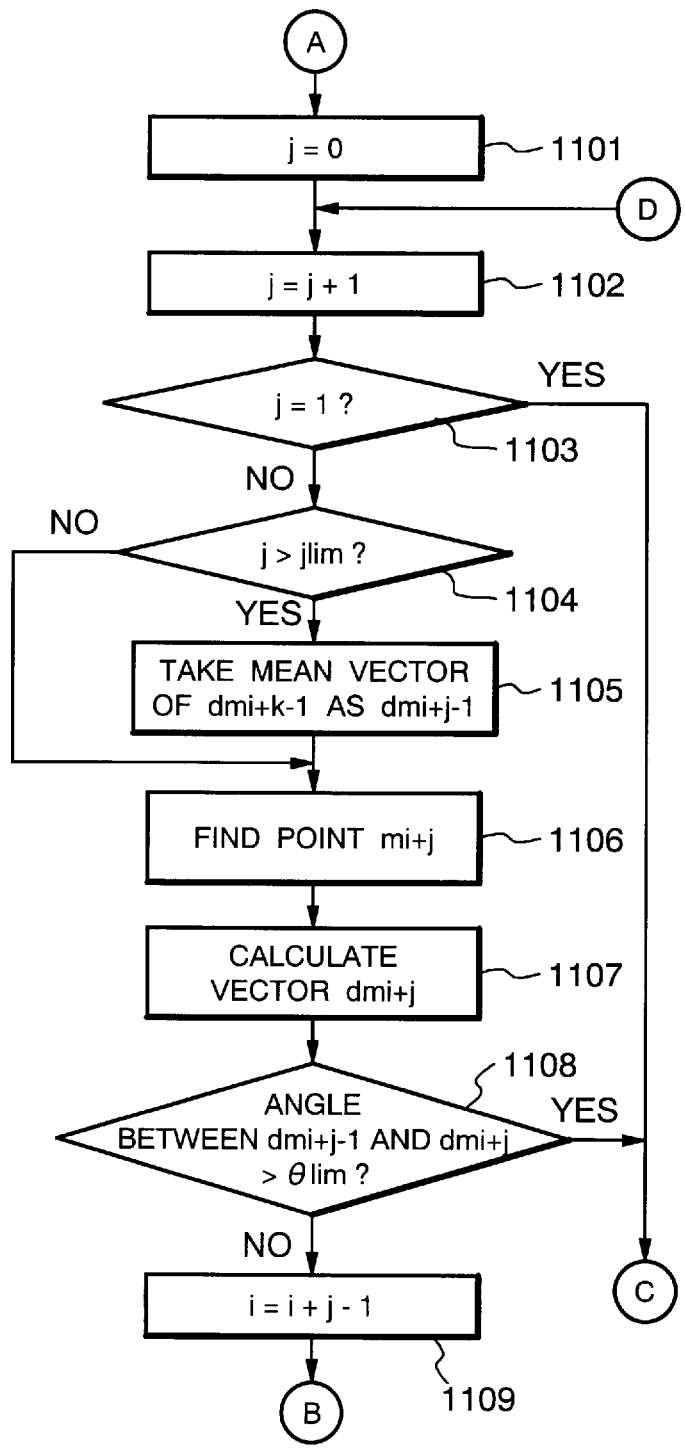
FIG. 11 is a flow chart of a device simulation method according to a second embodiment of the present invention which shows operation of the first stage for subdividing an element of an analysis mesh.

FIG. 11 is a flow chart showing a device simulation method according to a second embodiment of the present invention. FIG. 11 shows part of the operation according to the second embodiment and out of the operations of the first embodiment illustrated in FIGS. 1 to 3, the figure corresponds to that illustrated in FIG. 2. Since in this embodiment, operations corresponding to those illustrated in FIGS. 1 and 3 are the same as those of the first embodiment, their description is omitted.

With reference to FIG. 11, operations at Steps 1101 to 1103 are the same as those at Steps 201 to 203 in FIG. 2. Operations at Steps 1106 to 1109 are the same as those at Steps 204 to 207 in FIG. 2.

This embodiment includes, prior to Step 1106 for finding the point "$m_{i+j}$", Steps 1104 and 1105 for tracing the line of electric force in the vicinity of a valley-formed potential portion by using a mean vector of previous search vectors. More specifically, the same processing as that shown in FIG. 11 and that shown in FIG. 3 is repeated and when "j" exceeds a preset value "$j_{lim}$" (Step 1104), a mean vector of vectors "$dm_{i+h-1}$" calculated according to the following equation (24) is taken as a search direction vector "$dm_{i+j-1}$", (Step 1105).

$$dm_{i+j-1} = \frac{1}{h_{lim}} \sum_{h=j-h_{lim}}^{j} dm_{i+h-1} \qquad (24)$$

Then, using the calculated search direction vector "$dm_{i+j-1}$" processing of Step 1106 and the following steps is executed. Insertion of the above-described steps enables a line of electric force at a valley-formed or ridged potential portion to be traced with a less number of subdividing points. As the constants "$j_{lim}$" and "$h_{lim}$" used in Steps 1104 and 1105, appropriate values are set to satisfy $j_{lim} > h_{lim}$ in advance.

Figure 12:
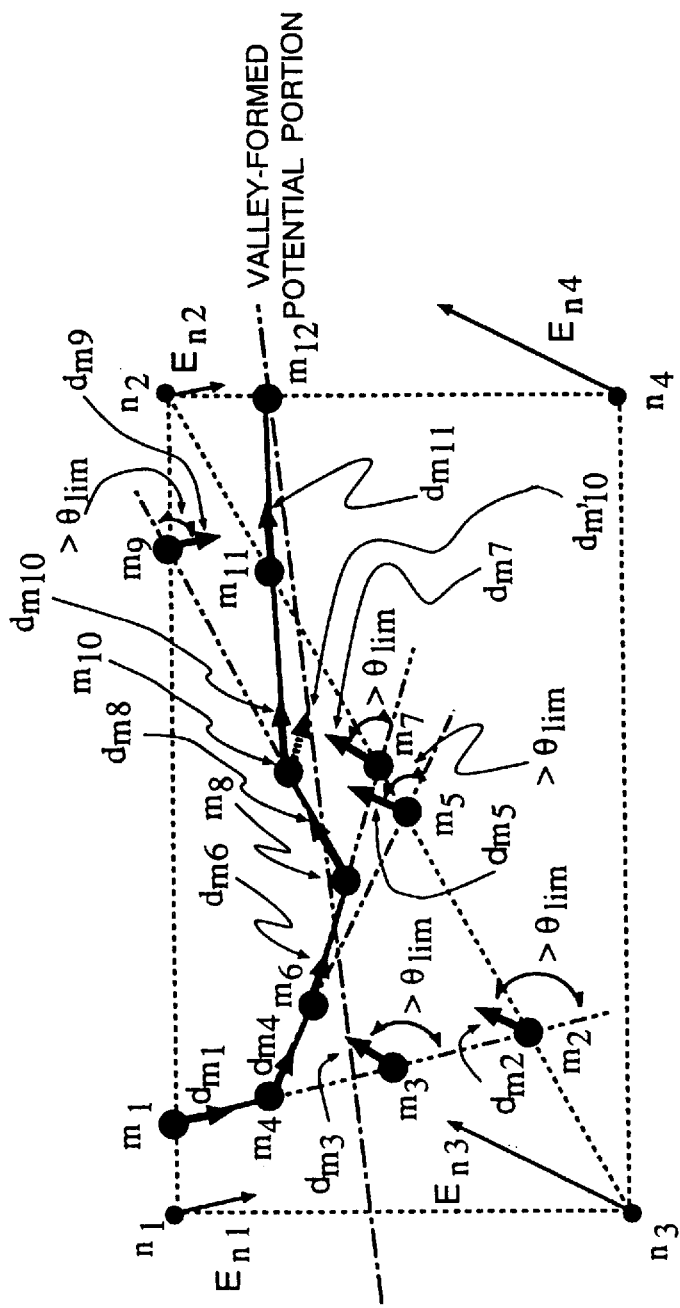
FIG. 12 is a schematic diagram showing a procedure of the line of electric force searching processing according to the second embodiment.

FIG. 12 is a diagram schematically showing a processing procedure according to the present embodiment. A triangular mesh expressed by dotted lines in FIG. 12 represents a part of meshes for use in solving the basic equations. With reference to the schematic diagram of FIG. 12 and the flow chart of FIG. 11, operation of the processing according to the present embodiment will be specifically described in the following. Since operations corresponding to the flow charts of FIGS. 1 and 3 of the first embodiment are the same also in the this embodiment, their description is omitted. It is assumed in the following description that the line of electric force is traced in the forward direction and the constants "$j_{lim}$" and "$h_{lim}$" are 3 and 2, respectively.

After tracing the line of electric force up to the point "$m_{10}$" in FIG. 12 following the processing procedures shown in FIGS. 1, 11 and 3, as in the above-described first embodiment, determination processing at Step 1104 results in j=4, which satisfies $j > j_{lim}(=3)$ to execute Step 1105.

Since $h_{lim}$ is set to be 2, a mean vector between the immediately preceding search direction vector "$dm_8$" and a vector "$dm'_{10}$" calculated by using the equations (20), (21), (22) and (23) is obtained and is taken as the search direction vector "$dm_{10}$" at Step 1105. This enables the line of electric force to be traced with a less number of subdividing points than those required in a case where the vector "$dm'_{10}$" is taken as a search direction vector extended from the point "$m_{10}$".

Figure 13:
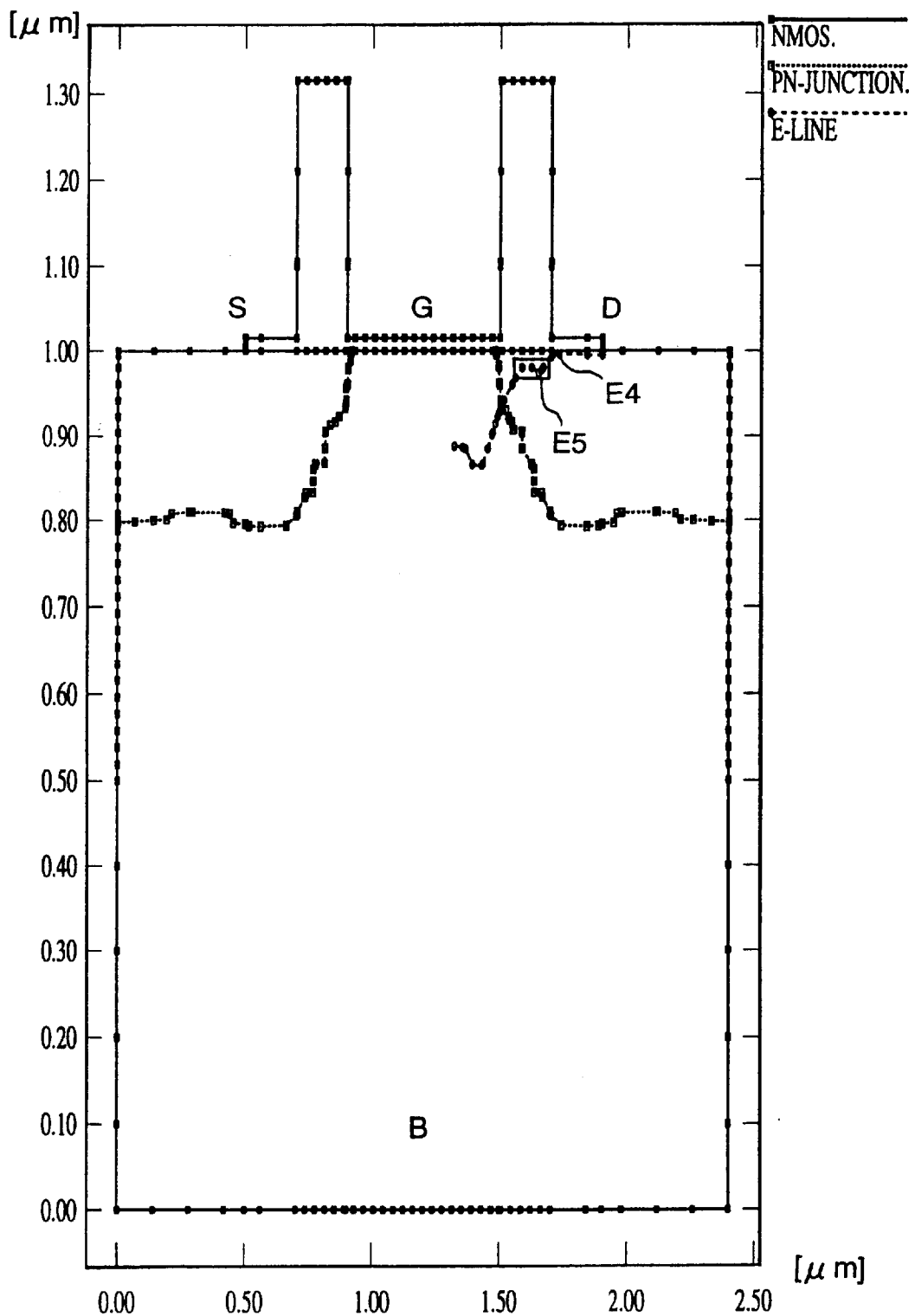
FIG. 13 is a diagram showing one example of a result obtained by applying the simulation according to the second embodiment to the MOS device of FIG. 5.

FIG. 13 shows an example of a line of electric force traced while analyzing the state where 0.0 V bias voltage is applied to the source electrode "S" of the MOS device illustrated in FIG. 5 as an object of processing, 1.0 V to the gate electrode "G", 2.0 V to the drain electrode "D" and 0.0 V to the substrate electrode "B". It is seen from FIG. 13 that with a point "E4" on the PN junction located at the edge of the drain region selected as a starting point, the line of electric force is traced in the direction toward the inside of the substrate and in the direction toward the gate electrode through the gate oxide film.

Figure 14:
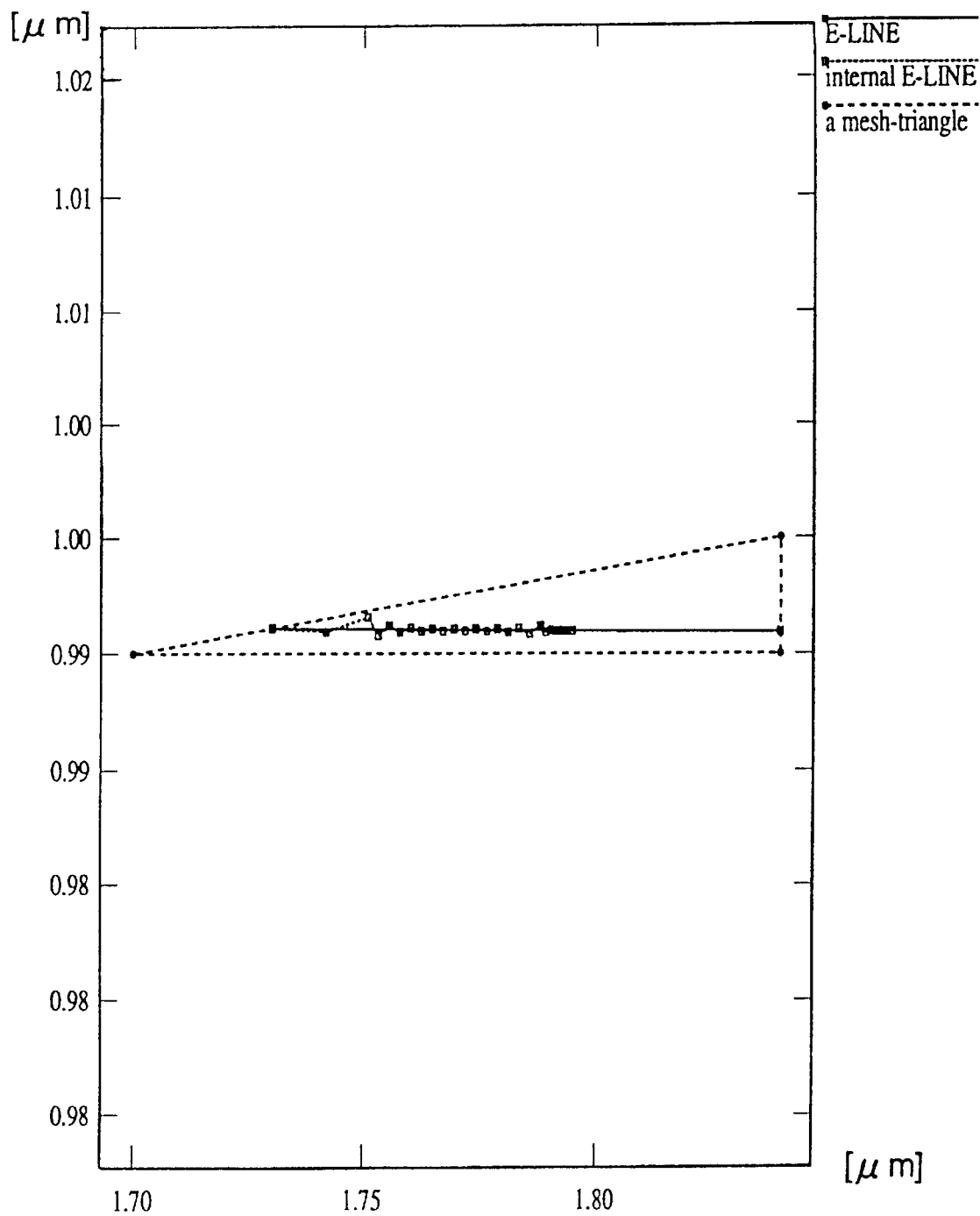
FIG. 14 is an enlarged view of a main part of FIG. 13.

FIG. 14 is an enlarged view of a main part showing the expansion of a portion "E5" corresponding to the valley-formed potential portion, together with the line of electric force traced within the mesh triangular element. In FIG. 14, the triangle expressed by the dotted line is a mesh triangular element. In the illustrated example, the constants used at Steps 1104 and 1105, $j_{lim}$ and $k_{lim}$, are set to be 20 and 10, respectively.

It can be seen from FIG. 14 that at a portion where the potential distribution is ridged immediately under the gate interface, the line of electric force is traced from the left side, and after "j" exceeds "$j_{lim}$ (=20)", a search direction vector is determined using a mean vector. As a result, the search vectors are directed along the ridged potential portion, preventing tracing of subdividing points on the right side of the line of electric force within the triangular element.

Figure 15:
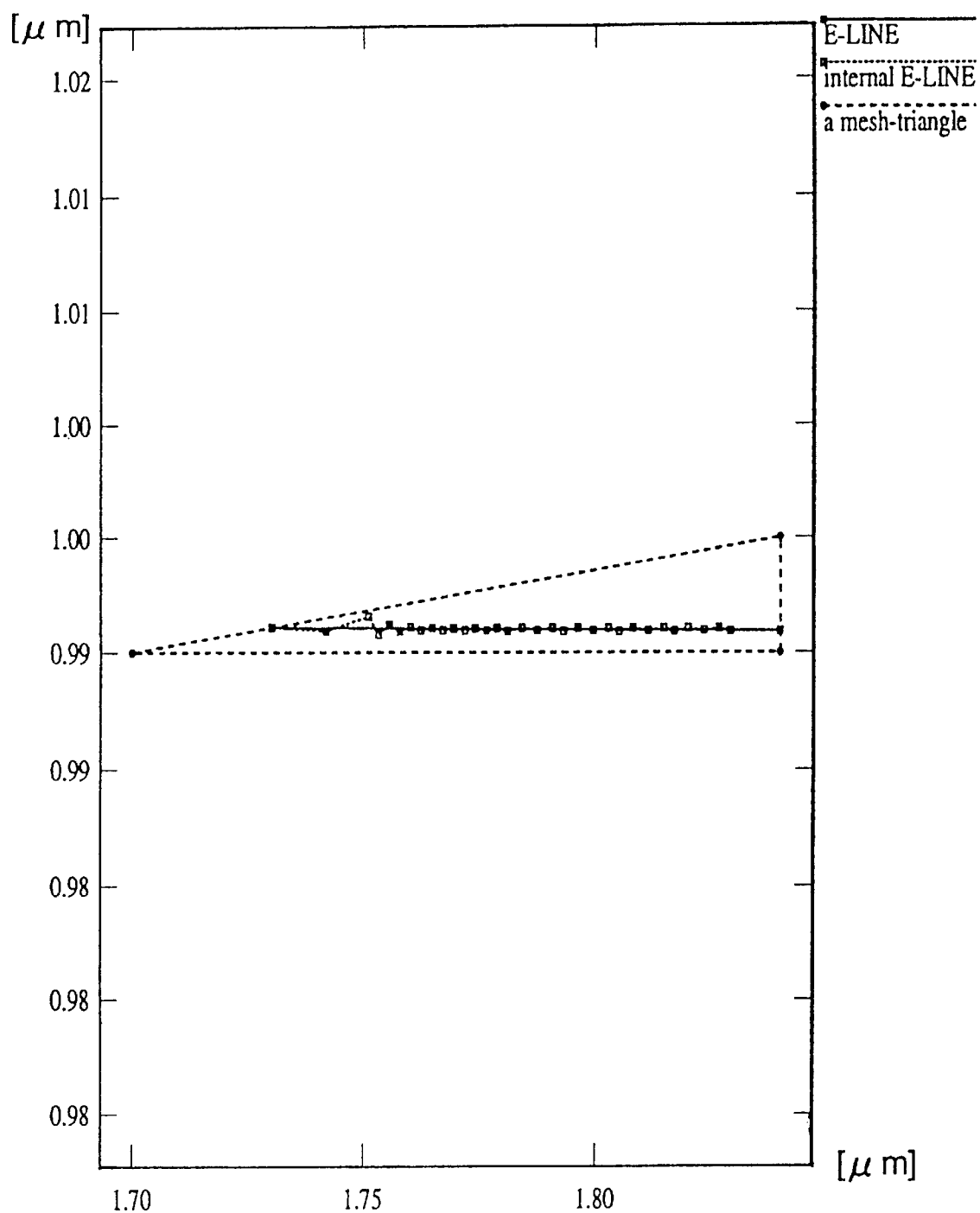
FIG. 15 is an enlarged view of a main part of FIG. 13.
Figure 16:
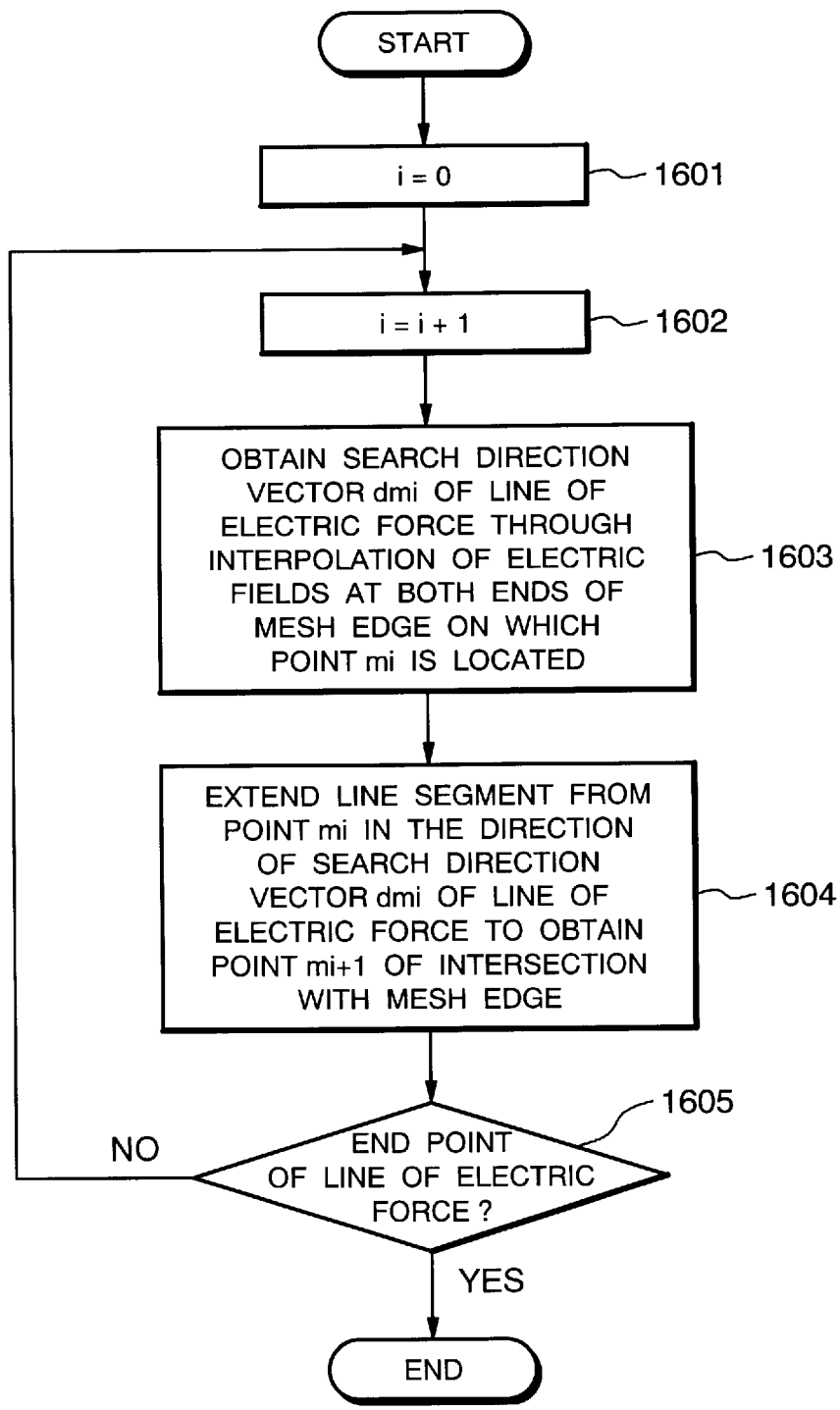
FIG. 16 is a flow chart showing a conventional device simulation method.
Figure 17:
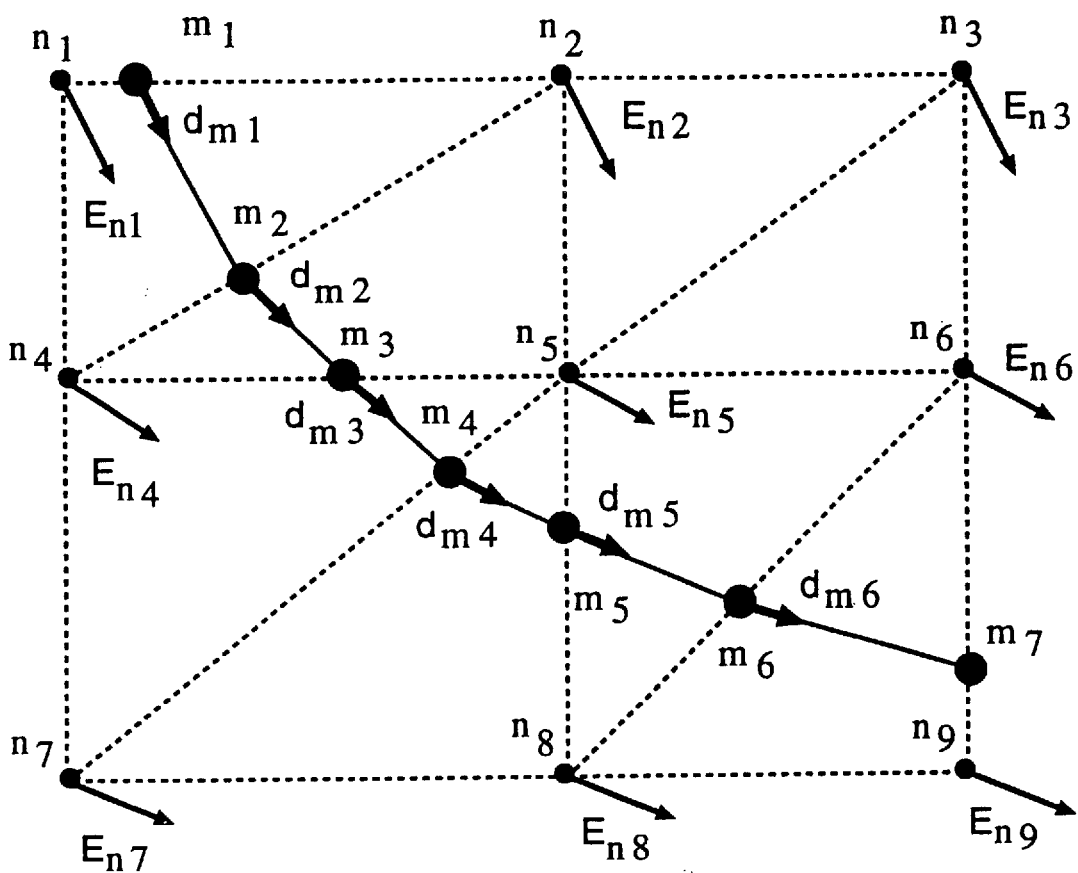
FIG. 17 is a schematic diagram showing one example of search of a line of electric force according to the conventional device simulation method.
Figure 18A:
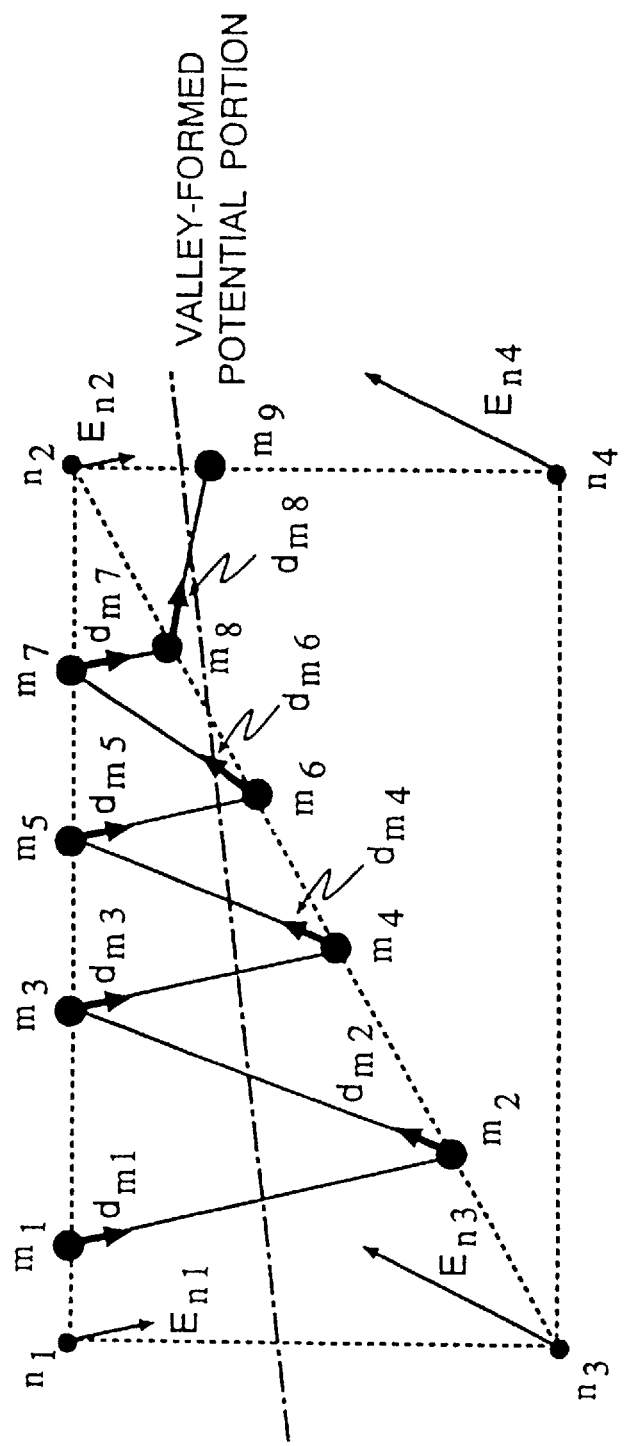
FIG. 18 is a schematic diagram showing one example of a result of search of a line of electric force according to the conventional device simulation method.
Figure 18B:
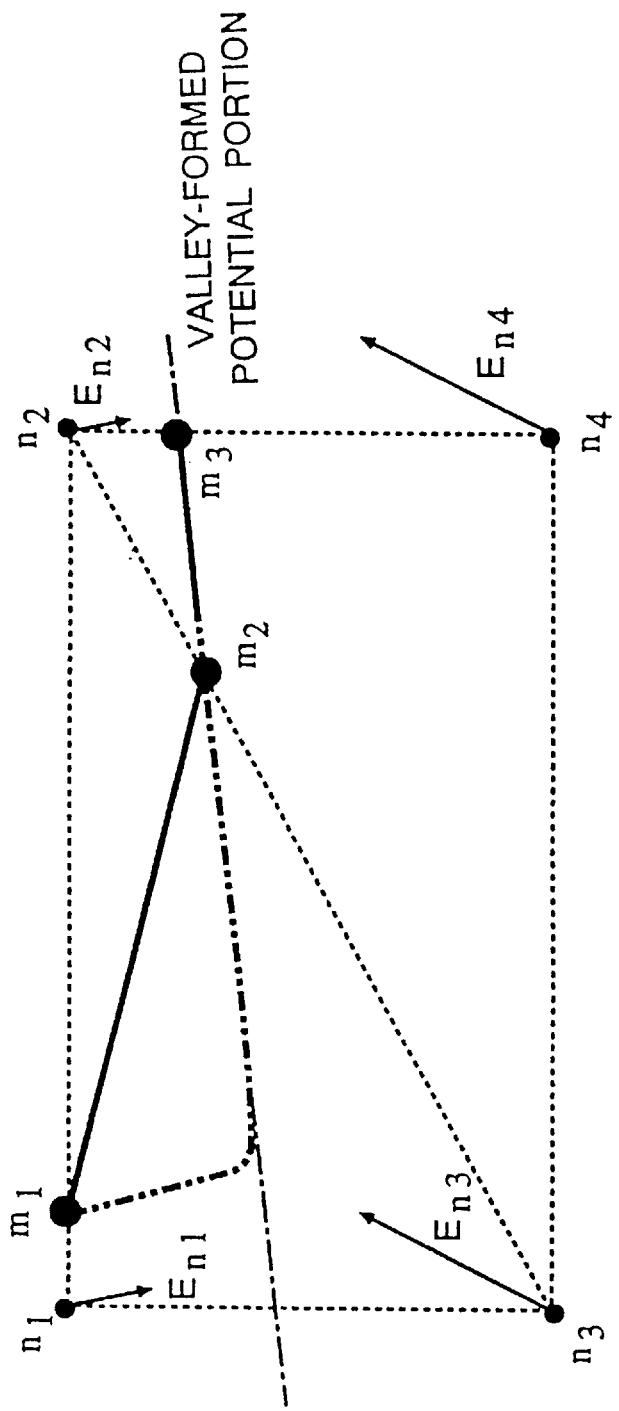

FIG. 15 shows the results of tracing of the line of electric force at the same portion which are obtained by using the manner according to the first embodiment illustrated in FIGS. 1 to 3. It can be seen from FIG. 15 that since no mean vector is used, the line of electric force is traced with subdividing points even on the right side of the line of electric force within the triangular element. Comparison between FIGS. 14 and 15 shows that the second embodiment enables the processing steps required for the first embodiment to be reduced to realize efficient processing.

In the device simulation method of the present invention, as described in the foregoing, when a line of electric force is to be traced for use in numerical analyses of a semiconductor device as an object of processing, if an angle between a search direction vector leading to a given point and a search direction vector extending from the point exceeds a predetermined upper limit value, the line of electric force is traced with an element of an analysis mesh for discretization of the semiconductor device subdivided. When the semiconductor device includes an electric field drastically changing portion, this prevents the line of electric force from zigzagging due to fluctuation in search direction to enable smooth tracing of the line at the region in question, thereby realizing highly precise simulation.

In addition, when the number of times of subdivision of an element of an analysis mesh exceeds a predetermined number of times, calculating a mean vector of search direction vectors generated in the course of subdivision of the element of the analysis mesh and taking the mean vector as a new search direction vector has an effect of drastically reducing the number of times of subdivision of the element of the analysis mesh to realize efficient tracing of the line of electric force.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A device simulation method of executing the processing for recognizing a line of electric force for use in numerical analyses of a semiconductor device as an object of processing through tracing of a point on a mesh edge of an analysis mesh generated on the semiconductor device, comprising:

a line of electric force calculating step of calculating a search direction vector based on predetermined rules, with a predetermined point set on a mesh edge of said analysis mesh or within said analysis mesh as a starting point, linking the starting point of said search direction vector with a point set on a straight line extending in the direction of the search direction vector based on predetermined rules, and repeating, as necessary, the processing for calculating a search direction vector, with said newly set point as a starting point, and the processing for linking the starting point of the calculated search direction vector with a newly set point; and a line of electric force subdividing step of setting, as necessary, a new point on a line segment linking the starting point of said search direction vector set at said line of electric force calculating step and the newly set point, further repeating, as necessary, the processing for setting another new point on the line segment linking the starting point of said search direction vector and the newly set point to shorten the line segment, and when a predetermined condition is satisfied, replacing the point newly set at said line of electric force calculating step with a point lastly set at the time when said predetermined condition is satisfied, to return the routine to said line of electric force calculating step.

2. The device simulation method as set forth in claim 1, wherein said line of electric force calculating step comprising:
first step of calculating a search direction vector, with a predetermined point as a starting point,
second step of obtaining an intersection point between a straight line extending in the direction of the search direction vector calculated at said first step and a mesh edge,
third step of calculating a search direction vector, with the point on the mesh edge obtained at said second step as a starting point,
fourth step of determining whether an angle between the straight line extending in the direction of the search direction vector calculated at said first step and the search direction vector calculated at said third step is more than a preset upper limit value, and if so, proceeding to said line of electric force subdividing step, and
fifth step of determining, when the angle between said straight line and said search direction vector is not more than said upper limit value at the determination of said fourth step, whether the point on the mesh edge obtained at said second step is the end point of the line of electric force in the analysis mesh, and if it is the end point of the line of electric force, completing the processing and if not, replacing the search direction vector calculated at said first step with the search direction vector calculated at said third step to return the routine to said second step.

3. The device simulation method as set forth in claim 1, wherein said line of electric force subdividing step comprising:
first step of setting, on the line segment linking the starting point of said search direction vector obtained at said line of electric force calculating step with the point set on the straight line extending from the starting point in the direction of said search direction vector, a subdividing point for shortening the line segment based on predetermined rules, second step of calculating a search direction vector, with said subdividing point set at said first step as a starting point, third step of determining whether an angle between the straight line extending in the direction of the search direction vector at said first step and the search direction vector calculated at said second step is more than a preset upper limit value, and when the angle is more than the value, repeating the processing for setting a subdividing point which will further shorten the line segment linking the starting point of said search direction vector at said first step with said subdividing point set at said first step until the angle has a value smaller than said upper limit value, and fourth step of replacing the subdividing point set at said first step with a subdividing point lastly set at said third step to return the routine to said line of electric force calculating step.

4. The device simulation method as set forth in claim 1, wherein said line of electric force calculating step comprising:

first step of calculating a search direction vector, with a predetermined point as a starting point, second step of obtaining an intersection point between a straight line extending in the direction of the search direction vector calculated at said first step and a mesh edge, third step of calculating a search direction vector, with the point on the mesh edge obtained at said second step as a starting point, fourth step of determining whether an angle between the straight line extending in the direction of the search direction vector calculated at said first step and the search direction vector calculated at said third step is more than a preset upper limit value, and if so, proceeding to said line of electric force subdividing step, and fifth step of determining, when the angle between said straight line and said search direction vector is not more than said upper limit value at the determination of said fourth step, whether the point on the mesh edge obtained at said second step is the end point of the line of electric force in the analysis mesh, and if it is the end point of the line of electric force, completing the processing and if not, replacing the search direction vector calculated at said first step with the search direction vector calculated at said third step to return the routine to said second step, and said line of electric force subdividing step comprising:

sixth step of setting, on the line segment linking the starting point of said search direction vector calculated at said first or third step of said line of electric force calculating step with the point set on the straight line extending from the starting point in the direction of said search direction vector, a subdividing point for shortening the line segment based on predetermined rules, seventh step of calculating a search direction vector, with said subdividing point set at said sixth step as a starting point, eighth step of determining whether an angle between the straight line extending in the direction of the search direction vector at said sixth step and the search direction vector calculated at said seventh step is more than a preset upper limit value, and when the angle is more than the value, repeating the processing for setting a subdividing point which will further shorten the line segment linking the starting point of said search direction vector at said sixth step with said subdividing point set at said sixth step until the angle has a value smaller than said upper limit value, and ninth step of replacing the subdividing point set at said sixth step with a subdividing point lastly set at said eighth step to return the routine to said line of electric force calculating step.

5. The device simulation method as set forth in claim 1, wherein said line of electric force subdividing step comprising:

first step of setting, on the line segment linking the starting point of said search direction vector obtained at said line of electric force calculating step with the point set on the straight line extending from the starting point in the direction of said search direction vector, a subdividing point for shortening the line segment based on predetermined rules, second step of calculating a search direction vector, with said subdividing point set at said first step as a starting point, as well as calculating a mean vector of search direction vectors set so far and taking the mean vector as a search direction vector with said subdividing point as a starting point when the number of times of setting of subdividing points set at said first step exceeds a predetermined number, third step of determining whether an angle between the straight line extending in the direction of the search direction vector at said first step and the search direction vector calculated at said second step is more than a preset upper limit value, and when the angle is more than the value, repeating the processing for setting a subdividing point which will further shorten the line segment linking the starting point of said search direction vector at said first step with said subdividing point set at said first step until the angle has a value smaller than said upper limit value, and fourth step of replacing the subdividing point set at said first step with a subdividing point lastly set at said third step to return the routine to said line of electric force calculating step.

6. The device simulation method as set forth in claim 1, wherein said line of electric force calculating step comprising:

first step of calculating a search direction vector, with a predetermined point as a starting point, second step of obtaining an intersection point between a straight line extending in the direction of the search direction vector calculated at said first step and a mesh edge, third step of calculating a search direction vector, with the point on the mesh edge obtained at said second step as a starting point, fourth step of determining whether an angle between the straight line extending in the direction of the search direction vector calculated at said first step and the search direction vector calculated at said third step is more than a preset upper limit value, and if so, proceeding to said line of electric force subdividing step, and fifth step of determining, when the angle between said straight line and said search direction vector is not more than said upper limit value at the determination of said fourth step, whether the point on the mesh edge obtained at said second step is the end point of the line of electric force in the analysis mesh, and if it is the end point of the line of electric force, completing the processing and if not, replacing the search direction vector calculated at said first step with the search direction vector calculated at said third step to return the routine to said second step, and said line of electric force subdividing step comprising:

sixth step of setting, on the line segment linking the starting point of said search direction vector calculated at said first or third step of said line of electric force calculating step with the point set on the straight line extending from the starting point in the direction of said search direction vector, a subdividing point for shortening the line segment based on predetermined rules, seventh step of calculating a search direction vector, with said subdividing point set at said sixth step as a starting point, as well as calculating a mean vector of search direction vectors set so far and taking the mean vector as a search direction vector with said subdividing point as a starting point when the number of times of setting of subdividing points set at said first step exceeds a predetermined number, eighth step of determining whether an angle between the straight line extending in the direction of the search direction vector at said sixth step and the search direction vector calculated at said seventh step is more than a preset upper limit value, and when the angle is more than the value, repeating the processing for setting a subdividing point which will further shorten the line segment linking the starting point of said search direction vector at said sixth step with said subdividing point set at said sixth step until the angle has a value smaller than said upper limit value, and ninth step of replacing the subdividing point set at said sixth step with a subdividing point lastly set at said eighth step to return the routine to said line of electric force calculating step.

7. In a computer readable memory storing a computer program for controlling a device simulator which is implemented by a computer system and executes the processing for tracing a point on a mesh edge of an analysis mesh generated on a semiconductor device as an object of processing to recognize a line of electric force for use in numerical analyses of the semiconductor device, said computer program comprising:

a line of electric force calculating step of calculating a search direction vector based on predetermined rules, with a predetermined point set on a mesh edge of said analysis mesh or within said analysis mesh as a starting point, linking the starting point of said search direction vector with a point set on a straight line extending in the direction of the search direction vector based on predetermined rules, and repeating, as necessary, the processing for calculating a search direction vector, with said newly set point as a starting point, and the processing for linking the starting point of the calculated search direction vector with a newly set point; and a line of electric force subdividing step of setting, as necessary, a new point on a line segment linking the starting point of said search direction vector set at said line of electric force calculating step and the newly set point, further repeating, as necessary, the processing for setting another new point on the line segment linking the starting point of said search direction vector and the newly set point to shorten the line segment, and when a predetermined condition is satisfied, replacing the point newly set at said line of electric force calculating step with a point lastly set at the time when said predetermined condition is satisfied, to return the routine to said line of electric force calculating step.

8. The computer readable memory as set forth in claim 7, wherein in said computer program, said line of electric force calculating step comprising:

first step of calculating a search direction vector, with a predetermined point as a starting point, second step of obtaining an intersection point between a straight line extending in the direction of the search direction vector calculated at said first step and a mesh edge, third step of calculating a search direction vector, with the point on the mesh edge obtained at said second step as a starting point, fourth step of determining whether an angle between the straight line extending in the direction of the search direction vector calculated at said first step and the search direction vector calculated at said third step is more than a preset upper limit value, and if so, proceeding to said line of electric force subdividing step, and fifth step of determining, when the angle between said straight line and said search direction vector is not more than said upper limit value at the determination of said fourth step, whether the point on the mesh edge obtained at said second step is the end point of the line of electric force in the analysis mesh, and if it is the end point of the line of electric force, completing the processing and if not, replacing the search direction vector calculated at said first step with the search direction vector calculated at said third step to return the routine to said second step.

9. The computer readable memory as set forth in claim 7, wherein in said computer program, said line of electric force subdividing step comprising:

first step of setting, on the line segment linking the starting point of said search direction vector obtained at said line of electric force calculating step with the point set on the straight line extending from the starting point in the direction of said search direction vector, a subdividing point for shortening the line segment based on predetermined rules, second step of calculating a search direction vector, with said subdividing point set at said first step as a starting point, third step of determining whether an angle between the straight line extending in the direction of the search direction vector at said first step and the search direction vector calculated at said second step is more than a preset upper limit value, and when the angle is more than the value, repeating the processing for setting a subdividing point which will further shorten the line segment linking the starting point of said search direction vector at said first step with said subdividing point set at said first step until the angle has a value smaller than said upper limit value, and fourth step of replacing the subdividing point set at said first step with a subdividing point lastly set at said third step to return the routine to said line of electric force calculating step.

10. The computer readable memory as set forth in claim 7, wherein in said computer program,
   said line of electric force calculating step comprising:
      first step of calculating a search direction vector, with a predetermined point as a starting point,
      second step of obtaining an intersection point between a straight line extending in the direction of the search direction vector calculated at said first step and a mesh edge,
      third step of calculating a search direction vector, with the point on the mesh edge obtained at said second step as a starting point,
      fourth step of determining whether an angle between the straight line extending in the direction of the search direction vector calculated at said first step and the search direction vector calculated at said third step is more than a preset upper limit value, and if so, proceeding to said line of electric force subdividing step, and
      fifth step of determining, when the angle between said straight line and said search direction vector is not more than said upper limit value at the determination of said fourth step, whether the point on the mesh edge obtained at said second step is the end point of the line of electric force in the analysis mesh, and if it is the end point of the line of electric force, completing the processing and if not, replacing the search direction vector calculated at said first step with the search direction vector calculated at said third step to return the routine to said second step, and
   said line of electric force subdividing step comprising:
      sixth step of setting, on the line segment linking the starting point of said search direction vector calculated at said first or third step of said line of electric force calculating step with the point set on the straight line extending from the starting point in the direction of said search direction vector, a subdividing point for shortening the line segment based on predetermined rules,
      seventh step of calculating a search direction vector, with said subdividing point set at said sixth step as a starting point,
      eighth step of determining whether an angle between the straight line extending in the direction of the search direction vector at said sixth step and the search direction vector calculated at said seventh step is more than a preset upper limit value, and when the angle is more than the value, repeating the processing for setting a subdividing point which will further shorten the line segment linking the starting point of said search direction vector at said sixth step with said subdividing point set at said sixth step until the angle has a value smaller than said upper limit value, and
      ninth step of replacing the subdividing point set at said sixth step with a subdividing point lastly set at said eighth step to return the routine to said line of electric force calculating step.

11. The computer readable memory as set forth in claim 7, wherein in said computer program,
   said line of electric force subdividing step comprising:
      first step of setting, on the line segment linking the starting point of said search direction vector obtained at said line of electric force calculating step with the point set on the straight line extending from the starting point in the direction of said search direction vector, a subdividing point for shortening the line segment based on predetermined rules,
      second step of calculating a search direction vector, with said subdividing point set at said first step as a starting point, as well as calculating a mean vector of search direction vectors set so far and taking the mean vector as a search direction vector with said subdividing point as a starting point when the number of times of setting of subdividing points set at said first step exceeds a predetermined number,
      third step of determining whether an angle between the straight line extending in the direction of the search direction vector at said first step and the search direction vector calculated at said second step is more than a preset upper limit value, and when the angle is more than the value, repeating the processing for setting a subdividing point which will further shorten the line segment linking the starting point of said search direction vector at said first step with said subdividing point set at said first step until the angle has a value smaller than said upper limit value, and
      fourth step of replacing the subdividing point set at said first step with a subdividing point lastly set at said third step to return the routine to said line of electric force calculating step.

12. The computer readable memory as set forth in claim 7, wherein in said computer program,
   said line of electric force calculating step comprising:
      first step of calculating a search direction vector, with a predetermined point as a starting point,
      second step of obtaining an intersection point between a straight line extending in the direction of the search direction vector calculated at said first step and a mesh edge,
      third step of calculating a search direction vector, with the point on the mesh edge obtained at said second step as a starting point,
      fourth step of determining whether an angle between the straight line extending in the direction of the search direction vector calculated at said first step and the search direction vector calculated at said third step is more than a preset upper limit value, and if so, proceeding to said line of electric force subdividing step, and
      fifth step of determining, when the angle between said straight line and said search direction vector is not more than said upper limit value at the determination of said fourth step, whether the point on the mesh edge obtained at said second step is the end point of the line of electric force in the analysis mesh, and if it is the end point of the line of electric force, completing the processing and if not, replacing the search direction vector calculated at said first step with the search direction vector calculated at said third step to return the routine to said second step, and
   said line of electric force subdividing step comprising:
      sixth step of setting, on the line segment linking the starting point of said search direction vector calculated at said first or third step of said line of electric force calculating step with the point set on the straight line extending from the starting point in the direction of said search direction vector, a subdividing point for shortening the line segment based on predetermined rules,
      seventh step of calculating a search direction vector, with said subdividing point set at said sixth step as a starting point, as well as calculating a mean vector of search direction vectors set so far and taking the mean vector as a search direction vector with said subdividing point as a starting point when the number of times of setting of subdividing points set at said first step exceeds a predetermined number, eighth step of determining whether an angle between the straight line extending in the direction of the search direction vector at said sixth step and the search direction vector calculated at said seventh step is more than a preset upper limit value, and when the angle is more than the value, repeating the processing for setting a subdividing point which will further shorten the line segment linking the starting point of said search direction vector at said sixth step with said subdividing point set at said sixth step until the angle has a value smaller than said upper limit value, and ninth step of replacing the subdividing point set at said sixth step with a subdividing point lastly set at said eighth step to return the routine to said line of electric force calculating step.

\* \* \* \* \*